(12) United States Patent
Abe

(10) Patent No.: US 8,311,332 B2
(45) Date of Patent: Nov. 13, 2012

(54) IMAGE PROCESSING SYSTEM, MASK FABRICATION METHOD, AND PROGRAM

(75) Inventor: Hiroshi Abe, Tokyo (JP)

(73) Assignee: Sony Corporation, Tokyo (JP)

(*) Notice: Subject to any disclaimer, the term of this patent is extended or adjusted under 35 U.S.C. 154(b) by 984 days.

(21) Appl. No.: 11/718,784

(22) PCT Filed: Aug. 31, 2006

(86) PCT No.: PCT/JP2006/017205
§ 371 (c)(1),
(2), (4) Date: Jan. 5, 2009

(87) PCT Pub. No.: WO2007/029591
PCT Pub. Date: Mar. 15, 2007

(65) Prior Publication Data
US 2009/0129635 A1    May 21, 2009

(30) Foreign Application Priority Data
Sep. 6, 2005 (JP) ................................. 2005-257857

(51) Int. Cl.
*G06K 9/00* (2006.01)
(52) U.S. Cl. .......................... 382/177; 382/199; 382/115

(58) Field of Classification Search .................. 382/190, 382/177, 100, 115
See application file for complete search history.

(56) References Cited

U.S. PATENT DOCUMENTS

| 5,369,714 | A | * | 11/1994 | Withgott et al. | 382/177 |
| 5,557,689 | A | * | 9/1996 | Huttenlocher et al. | 382/177 |
| 6,249,604 | B1 | * | 6/2001 | Huttenlocher et al. | 382/174 |
| 2006/0120561 | A1 | * | 6/2006 | Muratani | 382/100 |

FOREIGN PATENT DOCUMENTS

| JP | 06-282652 | 10/1994 |
| JP | 2004-178606 | 6/2004 |
| JP | 2004-329825 | 11/2004 |
| JP | 2005-056282 | 3/2005 |

OTHER PUBLICATIONS

International Search Report dated Oct. 31, 2006.

* cited by examiner

*Primary Examiner* — Hadi Akhavannik
(74) *Attorney, Agent, or Firm* — K&L Gates LLP

(57) ABSTRACT

An image processing system and a mask preparation method able to prepare a mask by simple processing and a program executed in such an image processing system are provided. To extract the edges of the image, strings of pixels corresponding to the contours of an object are extracted from the edge extracted image, and border lines for the masking are acquired based on an approximation line thereof.

24 Claims, 18 Drawing Sheets

(A)     (B)

(A)     (B)

(A)

(B)

(C)

(A)  (B)

(C)

(A)  (B)

(A)

(B)

(C)

(A)

(B)

(C)

(D)

(A)

(B)

(C)

(D)

IMAGE PROCESSING SYSTEM, MASK FABRICATION METHOD, AND PROGRAM

CROSS REFERENCE TO RELATED APPLICATIONS

The present application claims priority to Japanese Patent Document No. 2005-257857 filed on Sep. 6, 2005, the disclosure of which is herein incorporated by reference.

BACKGROUND

The present invention relates to an image processing system for preparing a mask used when cutting out an image of a predetermined object from an image and a mask preparation method and program for the same.

The present invention for example relates to an image processing system for preparing a mask used when cutting out an image of a biometric feature from an image captured for biometric authentication.

Along with the advances made in information communications utilizing networks, a personal authentication system having a higher safety is demanded.

Biometric authentication judges whether or not a person is a true registered person based on information obtained from physical characteristics of the person, for example, a fingerprint, voice print, retinal pattern, and vein pattern of a finger, therefore has the excellent characteristic that another person assuming the identity of a true person can be much reduced.

Japanese Patent Publication (A) No. 2004-329825 discloses a system for authenticating a person by emitting near-infrared light, capturing the image of a pattern of blood vessels of the finger, and comparing this with a previously registered pattern of the blood vessels.

When authenticating a person based on a blood vessel pattern, in general, processing a captured image by a suitable image filter makes the outer shape of the blood vessels stand out and facilitates the authentication of their characteristics. At this time, portions unnecessary for the authentication, for example, the system, background, etc. similarly end up standing out, therefore, there is a possibility of erroneous authentication of such unnecessary portions as blood vessels as they are.

Therefore, usually masking is performed for cutting out only an object necessary for authentication from a captured image.

The system disclosed in Japanese Patent Publication (A) No. 2005-56282 prepares a histogram representing the number of pixels having different pixel values included in a captured image, acquiring a threshold value for differentiating an object and the background portion based on this histogram, and using this threshold value to binarize the captured image to thereby prepare a mask.

In general, in a method using a threshold value to binarize an image, the threshold value for suitably cutting out an object changes according to the intensity of the rays irradiated to the object, the brightness of the background, the light transmittance of the object, and other conditions. For this reason, setting the threshold value in accordance with the captured image becomes necessary and the processing becomes complicated as in the system disclosed in Japanese Patent Publication (A) No. 2005-56282.

SUMMARY

From the above, it is required to provide an image processing system and a mask preparation method enabling the preparation of a mask by easy processing and a program executed in such an image processing system.

A first aspect of the present invention relates to an image processing system for preparing a mask cutting out an image of a predetermined object from an image. The image processing system has an edge extraction unit configured to extract the edges of the image; a pixel extraction unit configured to extract a string of first pixels included in a first region contiguous with a first reference line set on a plane of the image so as to pass through an inside of the image of the object, located on a plurality of parallel second reference lines set on the plane of the image, and nearest to the first reference line on the respective plurality of second reference lines and a string of second pixels included in a second region contiguous with the first reference line on an opposite side of the first region, located on the plurality of second reference lines, and nearest the first reference line on the respective plurality of second reference lines from among edges extracted at the edge extraction unit; a first intermediate point extraction unit configured to extract a string of intermediate points located between the first pixels and the second pixels on the respective plurality of second reference lines and in which a distance from the first pixels and the distance from the second pixels have a predetermined ratio; a division unit configured to divide the string of intermediate points extracted at the first intermediate point extraction unit to at least one section in which adjacent intermediate points are within a predetermined distance; an approximation line acquisition unit configured to acquire an approximation line of the string of intermediate points extracted at the first intermediate point extraction unit based on the intermediate points forming the longest section divided at the division unit; a second intermediate point extraction unit configured to extract the string of intermediate points having a difference from the approximation line acquired at the approximation line acquisition unit within the predetermined range from among intermediate points extracted at the first intermediate point extraction unit; and a first border line acquisition unit configured to acquire a first border line of the mask based on the approximation line of the string of first pixels located on the same second reference line as the string of intermediate points extracted at the second intermediate point extraction unit and acquire a second border line of the mask based on the approximation line of the string of second pixels located on the second reference line.

A second aspect of the present invention relates to an image processing system for preparing a mask for cutting out an image of a predetermined object from an image, the image processing system having an edge extraction unit configured to extract edges of the image; a first pixel extraction unit configured to extract a string of pixels included in one of two regions contiguous with a first reference line set on a plane of the image so as to pass through the inside of the image of the object, located on a plurality of parallel second reference lines set on the plane of the image, and nearest to the first reference line on the respective plurality of second reference lines from among edges extracted at the edge extraction unit; a division unit configured to divide the string of pixels extracted at the first pixel extraction unit into at least one section in which adjacent pixels are within a predetermined distance of each other; an approximation line acquisition unit configured to acquire an approximation line of the string of pixels extracted at the first pixel extraction unit based on pixels forming the longest section divided at the division unit; a second pixel extraction unit configured to extract a string of pixels having a difference from the approximation line acquired at the approximation line acquisition unit within a predetermined range among pixels extracted at the first pixel extraction unit; and a first border line acquisition unit configured to acquire a first border line of the mask based on the approximation line of the string of pixels extracted at the second pixel extraction unit.

The image processing system of the above second aspect may further have a second border line acquisition unit configured to move a strip shaped region sandwiched by two parallel sides in parallel with respect to the second reference lines, count the number of pixels of edges extracted at the edge extraction unit included in the region at each position of movement, and acquire a second border line of the mask in accordance with the line parallel to the sides included in the region at a position where the count becomes the largest. Further, it may set the acquired second border line as the first reference line.

A third aspect of the present invention relates to a mask preparation method for preparing a mask for cutting out an image of a predetermined object from an image, the mask preparation method having a first step of extracting the edges of the image; a second step of extracting a string of first pixels included in a first region contiguous with a first reference line set on a plane of the image so as to pass through an inside of the image of the object, located on a plurality of parallel second reference lines set on the plane of the image, and nearest to the first reference line on the respective plurality of second reference lines and a string of second pixels included in a second region contiguous with the first reference line on an opposite side of the first region, located on the plurality of second reference lines, and nearest to the first reference line on the respective plurality of second reference lines from among edges extracted at the first step; a third step of extracting a string of intermediate points located between the first pixels and the second pixels on the plurality of second reference lines and in which a distance from the first pixel and the distance from the second pixel have a predetermined ratio; a fourth step of dividing the string of intermediate points extracted at the third step into one or more sections in which adjacent intermediate points are within a predetermined distance of each other; a fifth step of acquiring an approximation line of the string of intermediate points extracted at the third step based on the intermediate points forming the longest section divided at the fourth step; a sixth step of extracting a string of intermediate points having a difference from the approximation line acquired at the fifth step within a predetermined range from among intermediate points extracted at the third step; and a seventh step of acquiring a first border line of the mask based on the approximation line of the string of first pixels located on the same second reference lines as the string of intermediate points extracted at the sixth step and acquiring a second border line of the mask based on the approximation line of the string of second pixels located on the second reference lines.

A fourth aspect of the present invention relates to a mask preparation method for preparing a mask for cutting out an image of a predetermined object from an image, having a first step of extracting edges of the image; a second step of extracting a string of first pixels included in one of two regions contiguous with the first reference line set on the plane of the image so as to pass through the inside of the image of the object, located on a plurality of parallel second reference lines set on the plane of the image, and nearest to the first reference line on the respective plurality of second reference lines from among edges extracted at the first step; a third step of dividing the string of first pixels extracted at the second step into at least one section in which adjacent first pixels are within a predetermined distance of each other; a fourth step of acquiring an approximation line of the string of first pixels extracted at the second step based on first pixels forming the longest section divided at the third step; a fifth step of extracting a string of first pixels having a difference from the approximation line acquired at the fourth step within a predetermined range among first pixels extracted at the second step; and a sixth step of acquiring a first border line of the mask based on the approximation line of the string of first pixels extracted at the fifth step.

The mask preparation method of the fourth aspect preferably may further have a seventh step of moving a strip shaped region sandwiched by two parallel sides in parallel with respect to the second reference lines, counting the number of pixels of edges extracted at the first step included in the region at each position of the movement, and acquiring a second border line of the mask in accordance with the line parallel to the sides included in the region at a position where the count becomes the largest.

Further, it may set the acquired second border line as the first reference line.

A fifth aspect of the present invention relates to a program for making an image processing system having a computer for preparing a mask for cutting out an image of a predetermined object from an image execute the following steps. The program of the present invention makes the image processing system execute a first step of extracting the edges of the image; a second step of extracting a string of first pixels included in a first region contiguous with a first reference line set on a plane of the image so as to pass through an inside of the image of the object, located on a plurality of parallel second reference lines set on the plane of the image, and nearest to the first reference line on the respective plurality of second reference lines and a string of second pixels included in a second region contiguous with the first reference line on an opposite side of the first region, located on the plurality of second reference lines, and nearest to the first reference line on the respective plurality of second reference lines from among edges extracted at the first step; a third step of extracting a string of intermediate points located between the first pixels and the second pixels on the plurality of second reference lines and in which a distance from the first pixel and the distance from the second pixel have a predetermined ratio; a fourth step of dividing the string of intermediate points extracted at the third step into one or more sections in which adjacent intermediate points are within a predetermined distance of each other; a fifth step of acquiring an approximation line of the string of intermediate points extracted at the third step based on the intermediate points forming the longest section divided at the fourth step; a sixth step of extracting a string of intermediate points having a difference from the approximation line acquired at the fifth step within a predetermined range from among intermediate points extracted at the third step; and a seventh step of acquiring a first border line of the mask based on the approximation line of the string of first pixels located on the same second reference lines as the string of intermediate points extracted at the sixth step and acquiring a second border line of the mask based on the approximation line of the string of second pixels located on the second reference lines.

A sixth aspect of the present invention relates to a program for making an image processing system having a computer for preparing a mask for cutting out an image of a predetermined object from an image execute the following steps. The program of the present invention makes the image processing system execute a first step of extracting edges of the image; a second step of extracting a string of first pixels included in one of two regions contiguous with the first reference line set on the plane of the image so as to pass through the inside of the image of the object, located on a plurality of parallel second reference lines set on the plane of the image, and nearest to the first reference line on the respective plurality of second reference lines from among edges extracted at the first step; a third step of dividing the string of first pixels extracted at the second step into at least one section in which adjacent first pixels are within a predetermined distance of each other; a fourth step of acquiring an approximation line of the string of first pixels extracted at the second step based on first pixels forming the longest section divided at the third step; a fifth step of extracting a string of first pixels having a difference from the approximation line acquired at the fourth step within a predetermined range among first pixels extracted at the second step; and a sixth step of acquiring a first border line of the mask based on the approximation line of the string of first pixels extracted at the fifth step.

The above program according to the sixth aspect preferably makes the image processing system execute a seventh step of moving a strip shaped region sandwiched by two parallel sides in parallel with respect to the second reference lines, counting the number of pixels of edges extracted at the first step included in the region at each position of the movement, and acquiring a second border line of the mask in accordance with the line parallel to the sides included in the region at a position where the count becomes the largest.

Further, preferably, it may set the acquired second border line as the first reference line.

EFFECT OF THE INVENTION

Additional features and advantages of the present invention are described in, and will be apparent from, the following Detailed Description and the Figures.

DESCRIPTION OF NOTATIONS

10 . . . control unit, 20 . . . light source, 30 . . . optical system, 40 . . . imaging unit, 50 . . . operation unit, 60 . . . storage unit, 101 . . . image acquisition unit, 102 . . . mask preparation unit, 103 . . . region specifying unit, 104 . . . edge enhancing unit, 105 . . . evaluation value acquisition unit, 106 . . . judgment unit, 107 . . . registration unit, 108 . . . comparison unit, 109 . . . display processing unit, 201, 211 . . . edge extraction units, 202, 213, 216 . . . pixel extraction units, 203 . . . intermediate point extraction unit, 204, 214 . . . division units, 205, 215 . . . approximation line acquisition units, 206 . . . intermediate point extraction unit, 207, 208, 212, 217, 218 . . . border line acquisition units, and 209, 219 . . . mask generation units.

DETAILED DESCRIPTION

First Embodiment

Figure 1:
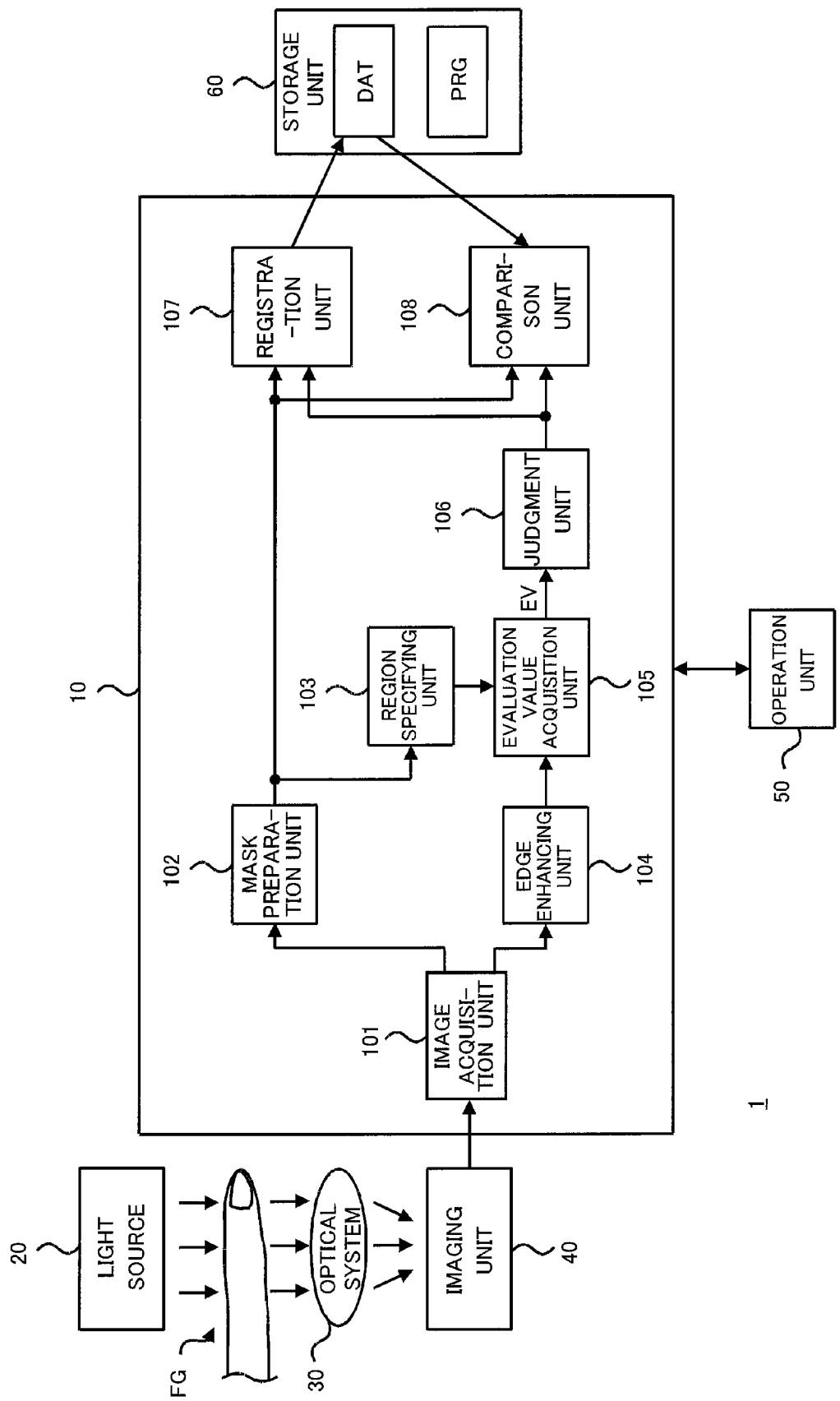
FIG. 1 is a diagram showing an example of the configuration of an image processing system according to an embodiment of the present invention.

FIG. 1 is a diagram showing an example of the configuration of an image processing system 1 according to an embodiment of the present invention.

The image processing system 1 has a control unit 10, light source 20, optical system 30, imaging unit 40, operation unit 50, and storage unit 60.

The light source 20 generates light striking an object FG, for example, in the example of FIG. 1, the finger of a person. This light is near-infrared light having a wavelength of for example about 600 nm to 1300 nm and has the properties of relatively high transmission through human tissue and distinctive absorption by the hemoglobin in the blood. The light source 20 is configured by for example a light emitting diode, a halogen lamp, etc.

The optical system 30 guides the light transmitted through the object FG to a light receiving surface of the imaging unit 40. In the image of the object FG projected onto the light receiving surface of the imaging unit 40, thicker blood vessel portions become darker.

The imaging unit 40 captures the image of the object FG projected onto its light receiving surface, transforms it to image data, and outputs the same to the control unit 10. The imaging unit 40 is configured by for example a CCD (charge coupled device), CMOS (complementary metal oxide semiconductor) sensor, or other imaging device.

The control unit 10 controls the overall operation of the image processing system and various signal processing. For example, it controls the generation of the light at the light source 20, the capture of the image at the imaging unit 40, etc. in response to an instruction of a user input from the operation unit 50. Further, it performs masking for cutting out an object from the image captured by the imaging unit 40, the processing for registering information of the blood vessel patterns (template) prepared based on the captured image in the storage unit 60, the processing for comparing the captured image and the template, and other various types of image processing relating to biometric authentication.

The control unit 10 is configured by for example a computer and executes the above control and signal processing based on a program PRG stored in the storage unit 60.

The operation unit 50 is an interface for inputting instructions of the user and is configured by keys, buttons, dials, a touch panel, a mouse, or other input device.

When the control unit 10 is realized by the computer, the storage unit 60 stores the program PRG run in that computer and the template DAT. Further, it stores data on constants utilized in the processing of the control unit 10, variable data which must be temporarily held in the process of the processing, etc.

The storage unit 60 is configured by for example a RAM (random access memory), ROM (read only memory), non-volatile memory, hard disk, or other storage device.

The components of the control unit 10 will be explained next.

The control unit 10 has, as functional components relating to the image processing, an image acquisition unit 101, mask preparation unit 102, region specifying unit 103, edge enhancing unit 104, evaluation value acquisition unit 105, judgment unit 106, registration unit 107, and comparison unit 108.

The region specifying unit 103 is an embodiment of the region specifying unit and region specifying means of the present invention.

The edge enhancing unit 104 is an embodiment of the edge enhancing unit and edge enhancing means of the present invention.

The evaluation value acquisition unit 105 is an embodiment of the evaluation value acquisition unit and evaluation value acquiring means of the present invention.

The judgment unit 106 is an embodiment of the judgment unit and judging means of the present invention.

Image Acquisition Unit

The image acquisition unit 101 sequentially acquires images captured at the imaging unit 40. Namely, when the registration and comparison of the template are started in response to an instruction input from the operation unit 50, the image acquisition unit 101 controls operations of the light source 20 and the imaging unit 40 so as to fire near-infrared light at the object FG and capture the projected image thereof to acquire the captured image data.

Mask Preparation Unit

The mask preparation unit 102 prepares a mask for cutting out the object FG from the captured image acquired at the image acquisition unit 101.

Figure 2:
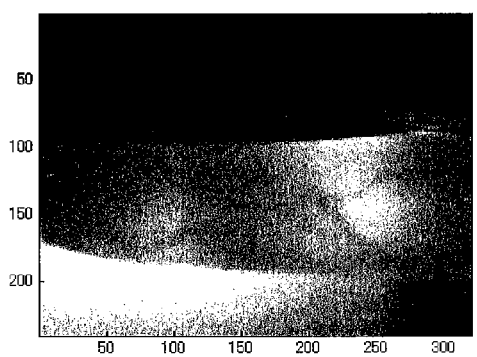
FIGS. 2(A) and 2(B) are views showing an example of an intermediate image extracted by filtering or other processing of images of blood vessels included in a captured image.
Figure 2:
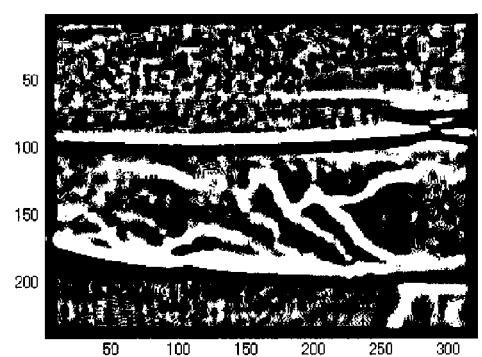

FIGS. 2(A) and 2(B) are views showing an example of an intermediate image of images of blood vessels included in the captured image as extracted by filtering or other processing. FIG. 2(A) shows an original captured image, and FIG. 2(B) shows an intermediate image thereof.

Referring to FIG. 2(B), the images of the blood vessels are reliably extracted thicker in the portion of the finger, but images of portions other than those (contours of the finger, background, etc.) are extracted in the same way as the blood vessels. The method of eliminating such unnecessary images by post-processing can be considered, but in that case, if the extracted images change in accordance with the background or characteristics of the blood vessel images and the images other than that become almost equal, it is difficult to eliminate only the unnecessary images. In addition, if proceeding with the processing while leaving the unnecessary images as they are, it becomes necessary to always perform the processing with respect to the entire image, therefore the amount of computation becomes large.

Figure 3:
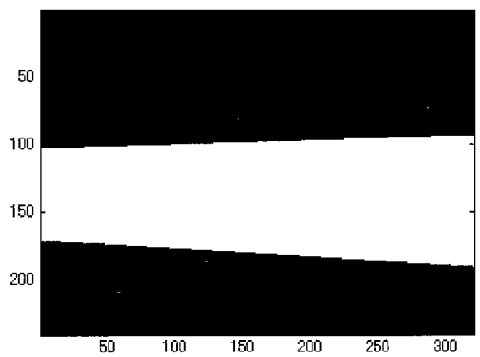
FIGS. 3(A) and 3(B) are views showing an example of a mask prepared in a mask preparation method and an intermediate image masked by using this.
Figure 3:
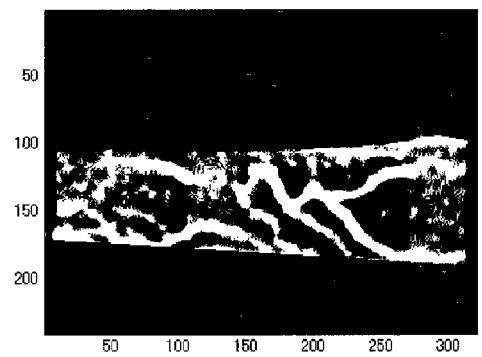

FIGS. 3(A) and 3(B) are views showing an example of a mask prepared at the mask preparation unit 102 and an intermediate image masked by using this. FIG. 3(A) shows a prepared mask, while FIG. 3(B) shows a masked intermediate image.

As shown in FIGS. 3(A) and 3(B), by applying masking, the information of the contours of the finger, the background, and other portions not the blood vessels can be eliminated. Further, the region cut out by the masking is known, therefore, when applying filtering or other processing to the masked intermediate image, only the required portion in the entire image need be processed. For this reason, it is possible to reduce the amount of computation in comparison with the case where the entire image is processed.

A more detailed configuration of the mask preparation unit 102 will be explained by referring to FIG. 12.

Edge Enhancing Unit

The edge enhancing unit 104 enhances the edges of the captured image acquired at the image acquisition unit 101.

For the enhancement of the edges of the image, for example a Gaussian filter, a Laplacian filter, or other image filter is used. Namely, a Gaussian filter is used to remove the noise components included in the image, then a Laplacian filter is used to enhance the changes of pixel values. Due to this, the dot-shaped noise components included in the image are eliminated, and line-shaped edge components are enhanced.

Figure 4:
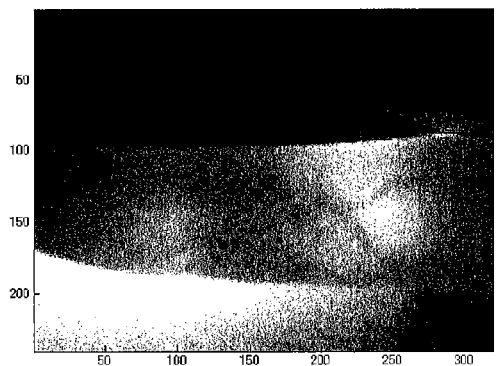
FIGS. 4(A) to 4(C) are views showing a first example of results obtained by applying edge enhancement to a captured image.
Figure 4:
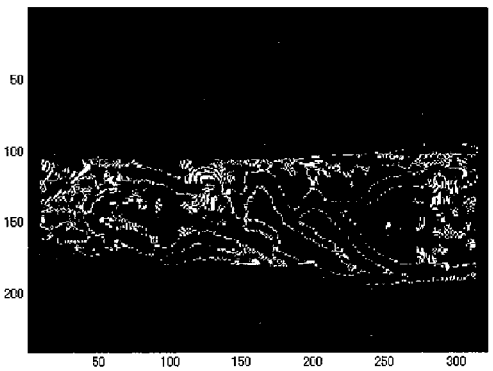
Figure 4:
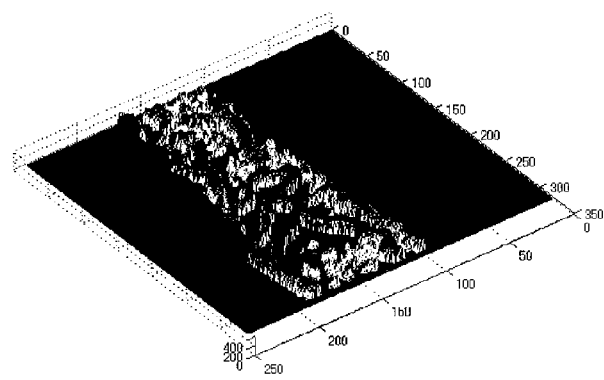

FIGS. 4(A), 4(B), and 4(C) are views showing a first example of results of applying edge enhancement by the Gaussian filter and Laplacian filter explained above to the captured image of the object FG.

FIG. 4(A) shows the image before the edge enhancement, and FIG. 4(B) shows the image after the edge enhancement. FIG. 4(C) is a view illustrating the pixel values of the image shown in FIG. 4(B) in three dimensions.

As seen from the example of FIGS. 4(A), 4(B), and 4(C), when applying edge enhancement to an image captured at the imaging unit 40, the pixel values of the blood vessel (particularly vein) portions of the finger stand out in comparison with the other portions.

All of the image before the edge enhancement shown in FIG. 4(A) and images after the edge enhancement shown in FIGS. 4(B) and 4(C) have 8-bit pixel values not having positive/negative signs.

When using a Gaussian filter and Laplacian filter to process an image having 8-bit pixel values, the pixel values after that processing may become values exceeding 8 bits. However, in the example of FIGS. 4(B) and 4(C), the pixel values after processing are limited to 8 bits, therefore the blood vessels of the original image shown in FIG. 4(A) and the blood vessels of the image after the edge enhancement shown in FIG. 4(B) do not match in their visual intensities so much. Namely, both the blood vessels which are thin and light and the blood vessels which are thick and dark come to have almost the same intensities in the images after the edge enhancement.

Figure 5:
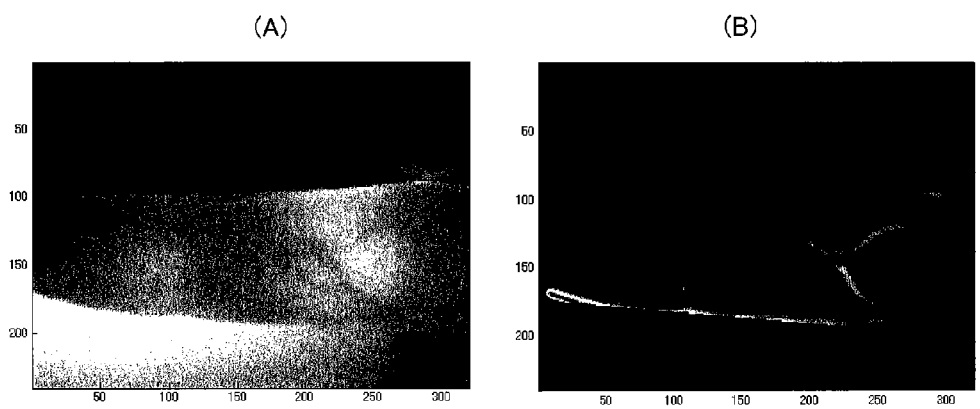
FIGS. 5(A) to 5(C) are views showing a second example of results obtained by applying edge enhancement to the captured image.

Contrary to this, FIGS. 5(A), 5(B), and 5(C) are views showing a second example of results of applying the same edge enhancement by the Gaussian filter and the Laplacian filter. The difference from the first example shown in FIGS. 4(A), 4(B), and 4(C) resides in that the bit limit of the pixel values after the edge enhancement is abolished.

FIG. 5(A) shows the image before the edge enhancement, and FIGS. 5(B) and 5(C) show images after the edge enhancement.

As seen from the comparison of FIGS. 4(A), 4(B), and 4(C) and FIGS. 5(A), 5(B), and 5(C), when abolishing the bit limit of the pixel values, the difference of contrast in the original image sensitively appears in the image after the edge enhancement, the pixel values of the dark veins become large, and the pixel values of the light veins become small.

In order to correctly judge at the judgment unit 106 whether or not the images of blood vessels desirable for the biometric authentication have been cut out by the mask prepared at the mask preparation unit 102, desirably the evaluation value acquisition unit 105 acquires an evaluation value Ev correctly reflecting the contrast of the blood vessels.

Therefore, the edge enhancing unit 104 abolishes the bit limit as shown in for example the images of FIGS. 4(A), 4(B), and 4(C) and sets the bit length of the pixel values after the edge enhancement to a suitable length. Due to this, an image sensitively representing the difference of contrast of the blood vessels as shown in FIGS. 5(A), 5(B), and 5(C) is supplied to the evaluation value acquisition unit 105.

Note that when abolishing the bit limit of the pixel values after the edge enhancement, as explained above, an image correctly reflecting the contrast of the blood vessels is obtained, but as shown in FIGS. 5(B) and 5(C), also the edges of the contour portions of the finger which are unnecessary as the template are enhanced. Particularly, when the background of the object FG is bright, the contours appear stronger than the blood vessels. If the contours are enhanced too much, even if preparing a mask correctly cutting out the object FG along the contours, the influence of the contours reaches up to the portions further inside from the contours, therefore the reliability of the evaluation value Ev is bottomed.

Therefore, the region specifying unit 103 explained next prepares the mask for cutting out the region reliably inside from the contours of the finger so that the evaluation value Ev is acquired in the state eliminating the influence of the contour portions.

Region Specifying Unit

The region specifying unit 103 specifies the region further inside from the mask prepared at the mask preparation unit 102 and prepares the mask for acquisition of the evaluation value for cutting out this specified region from the image after edge enhancement.

Figure 6:
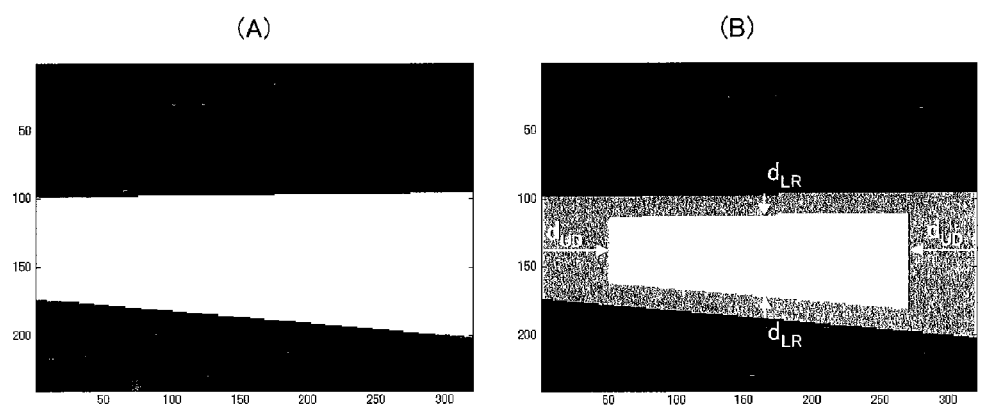
FIGS. 6(A) and 6(B) are views showing an example of a mask for cutting out an object from the captured images shown in FIGS. 4(A) to 4(C) and FIGS. 5(A) to 5(C).

FIGS. 6(A) and 6(B) are views showing an example specifying the inside region of the object FG from the captured images shown in FIGS. 4(A), 4(B), and 4(C) and FIGS. 5(A), 5(B), and 5(C).

FIG. 6(A) shows an example of the mask prepared at the mask preparation unit 102. The black portions of FIG. 6(A) show regions eliminated by the mask, while the white portion indicates the region cut out by the mask.

FIG. 6(B) shows an example of the region inside the object FG specified at the region specifying unit 103. The white portion of FIG. 6(B) indicates the region inside the object FG specified at the region specifying unit 103. Further, the gray portion indicates the portion inside the border lines of the mask shown in FIG. 6(A) and eliminated from the region specified at the region specifying unit 103.

In the example of FIGS. 6(A) and 6(B), the border lines of the mask prepared by the mask preparation unit 102 are comprised of four top, bottom, left, and right sides. When the border lines of the mask are comprised of a plurality of sides in this way, the region specifying unit 103 moves for example these sides to the inside from the border lines by exactly predetermined distances. Then, it specifies the region surrounded by the sides after movement as the region inside of the object FG. In the example of FIG. 6(B), it moves the side of the top side in a down direction of the image by exactly a distance $d_{LR}$, moves the side of the bottom side in an up direction of the image by exactly the distance $d_{LR}$, moves the side of the left side in a right direction of the image by exactly a distance $d_{UD}$, and moves the side of the right side in a left direction of the image by exactly the distance $d_{UD}$. Then, it specifies the region surrounded by the four sides after the movement as the region inside the object FG.

In this way, the region specified by the region specifying unit 103 is reliably separated from the contours of the object FG. For this reason, even in a case where the pixel values of the contours are abnormally high as shown in FIGS. 5(B) and 5(C), almost no influence thereof is exerted upon the inside of the region. Accordingly, if cutting out only the region specified by the region specifying unit 103 from the image after the edge enhancement by the masking, an image of pure blood vessels from which the influence of the contours is eliminated can be obtained.

When cutting out a portion inside from the contours of the object FG by the masking as explained above, the images of the blood vessels existing in the vicinity of the contours are eliminated from coverage when finding the evaluation value Ev. Namely, a portion of the information of the blood vessels will be lost. However, the images of the blood vessels existing in the vicinity of the contours easily change in accordance with the method of placing the finger and no longer appear in the captured image if just rotating the finger a little. The images of such blood vessels are originally images not suitable for biometric authentication (template registration, comparison, etc.), therefore there is no problem even if finding the evaluation value Ev from the result after eliminating these by the masking.

Evaluation Value Acquisition Unit

The evaluation value acquisition unit 105 acquires the evaluation value Ev concerning the intensity of edges and/or amount of edges included in the image input from the imaging unit 40 and covered by the signal processing based on the values of the pixels included in the image enhanced in edges at the edge enhancing unit 104. For example, it calculates the sum of values of all pixels included in the image after the edge enhancement and acquires this as the evaluation value Ev.

Note that the evaluation value acquisition unit 105 according to the present embodiment acquires the evaluation value Ev based on the values of the pixels included in the internal region of the object FG specified at the region specifying unit 103 among all pixels included in the image after the edge enhancement and does not utilize the values of pixels out of this region at the time of determination of the evaluation value Ev. Namely, it acquires the evaluation value Ev based on the pixel values of the region including the pure blood vessel images cut out by the mask prepared by the region specifying unit 103.

Figure 7:
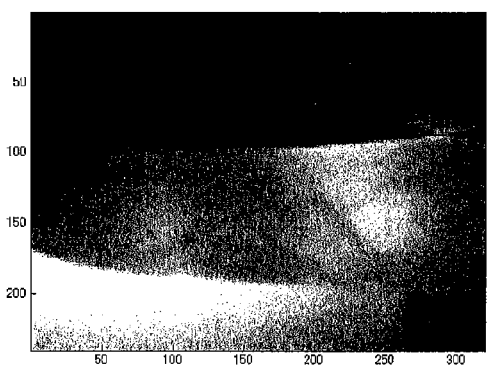
FIGS. 7(A) and 7(C) are views showing an example of cutting out an inside of an object by the mask shown in FIG. 6(B) from the image after the edge enhancement shown in FIG. 5(B).
Figure 7:
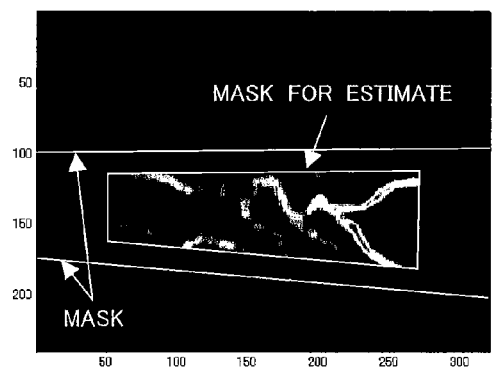
Figure 7:
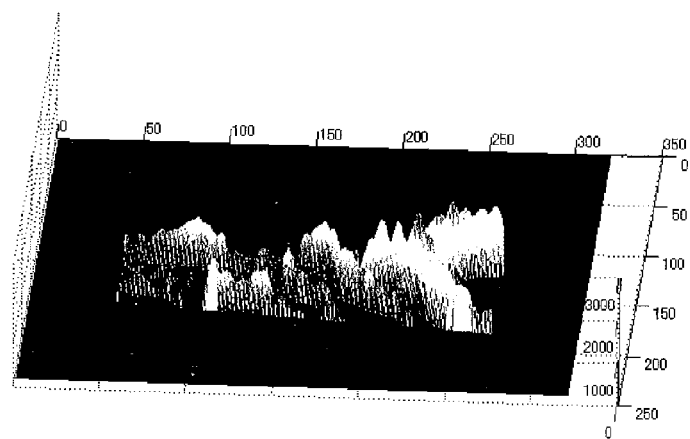

FIGS. 7(A), 7(B), and 7(C) are views showing an example of cutting out the region inside of the object FG by the mask shown in FIG. 6(B) from image after the edge enhancement shown in FIG. 5(B).

FIG. 7(A) shows the image before the edge enhancement. Further, FIGS. 7(B) and 7(C) show the image obtained by cutting out the inside region of the object FG from the image after the edge enhancement by the masking.

When cutting out only the region specified at the region specifying unit 103 from the image after edge enhancement, as shown in the images of FIGS. 7(B) and 7(C), the influence of the contours of the object FG is eliminated and only the images of the blood vessels existing inside of the object FG are made to stand out. In the images of the blood vessels, the pixel values largely change in accordance with the thickness and darkness of the blood vessels in the original images.

The evaluation value acquisition unit 105 calculates the sum of the pixel values in the image suitably reflecting the state of contrast of the blood vessels in this way as the evaluation value Ev. This evaluation value Ev becomes a value indicating the characteristics of the object FG suitable for the template registration and comparison.

FIGS. 8(A), 8(B), 8(C), and 8(D) are views showing an example of a case where the object FG is included in the image captured at the imaging unit 40 and a case where it is not included.

Figure 8:
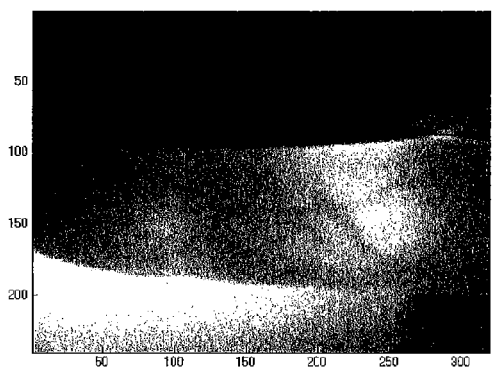
FIGS. 8(A) to 8(D) are views showing an example of a case where a predetermined object is included in a captured image and a case where it is not included.
Figure 8:
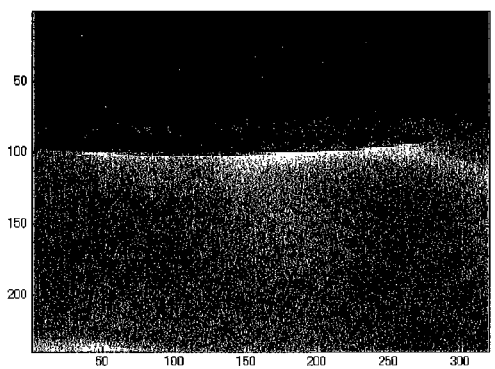
Figure 8:
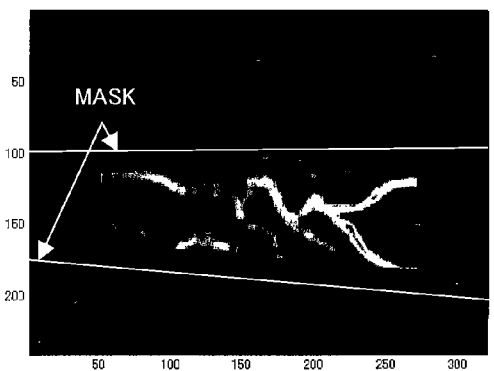
Figure 8:
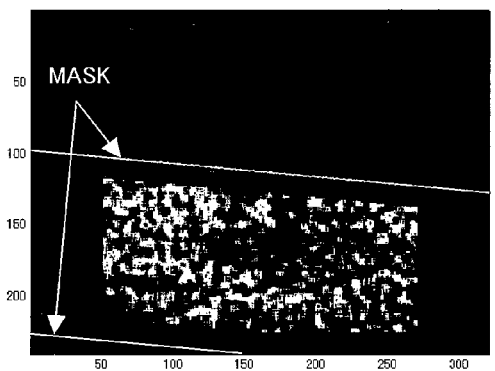

FIG. 8(A) shows a captured image including the object FG, while FIG. 8(C) shows the image after applying edge enhancement and masking to the image shown in this FIG. 8(A).

FIG. 8(B) shows a captured image not including the object FG, while FIG. 8(D) shows the image after applying edge enhancement and masking to the image shown in FIG. 8(B).

The blood vessels inside of the finger are beautifully reflected in the image of FIG. 8(A), therefore, in the image of FIG. 8(C) obtained by applying edge enhancement and masking to this, strong edges are locally concentrated at the portions of the blood vessels. On the other hand, no images of blood vessels are reflected in the image shown in FIG. 8(B). The contrast is poor, therefore in the image of FIG. 8(D) obtained by applying the edge enhancement and masking to this, weak edges are scattered as a whole and clear edges corresponding to the images of the blood vessels appear.

When comparing the sums of the pixel values of the two, the image of FIG. 8(C) became "2434244", and the image of FIG. 8(D) became "1177685". In this way, there is a large difference in the sums of pixel values between the case where the object FG is included and the case where it is not included. Accordingly, the evaluation value Ev acquired by the evaluation value acquisition unit 105 (namely the sum of pixel values of an image subjected to edge enhancement and masking) can express the existence of the object FG according to the difference of the values.

When comparing FIG. 8(C) and FIG. 8(D), the image not including the object FG includes many pixels having small pixel values (that is, weak edges) and has fewer pixels having large pixel values (that is, strong edges) in comparison with the image including the object FG. Therefore, the evaluation value acquisition unit 105 may not just sum up all pixel values, but also sum up only pixel values larger than a certain threshold value and acquire the result as the evaluation value Ev. Namely, it may acquire the evaluation value Ev based on the sum of values of pixels having edge intensities exceeding a predetermined threshold value among all pixels included in the image enhanced in edges at the edge enhancing unit 104 (note, in the region specified by the region specifying unit 103). Due to this, the difference of the evaluation value Ev between the case where the object FG is included and the case where it is not included can be made further conspicuous.

Figure 9:
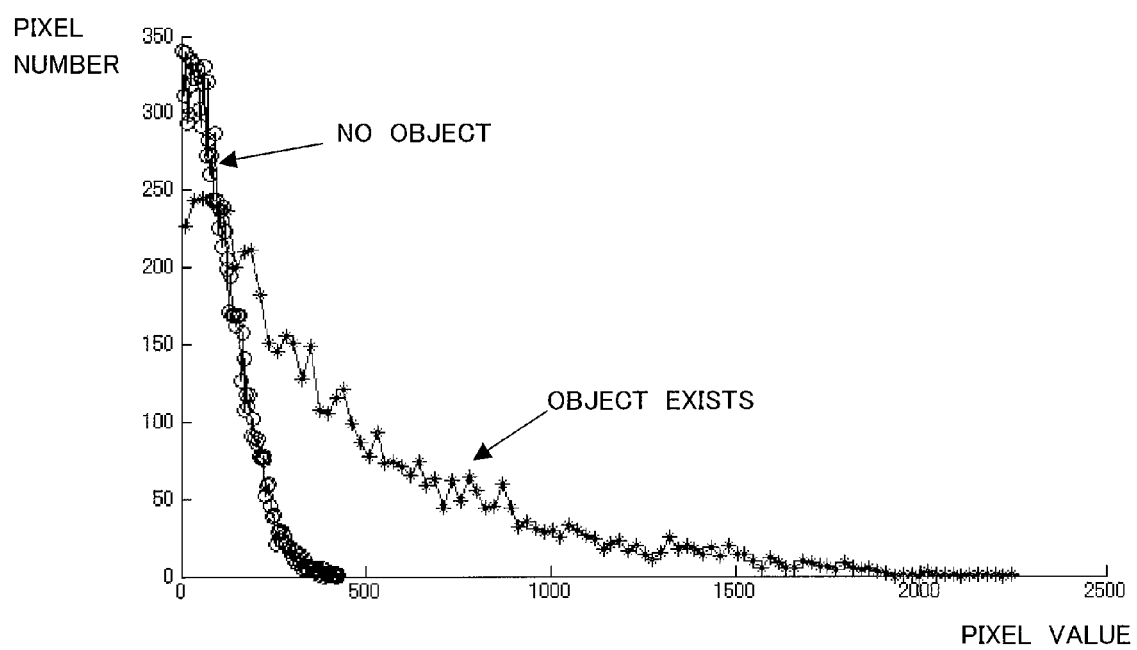
FIG. 9 is a diagram showing a comparison between a distribution of pixel values in the captured image including the object shown in FIG. 8(C) and a distribution of pixel values in the captured image not including the object shown in FIG. 8(D).

FIG. 9 is a diagram comparing a distribution of pixel values in the image shown in FIG. 8(C) (case including the object FG) and the distribution of pixel values in the image shown in FIG. 8(D) (case not including the object FG). The abscissa indicates the pixel values, and the ordinate indicates the number of pixels.

When the captured image does not include the object FG, the image after the edge enhancement and masking has almost all pixels distributed within a range smaller than a certain pixel value ("500" in the example of FIG. 9). On the other hand, when the captured image includes the object FG, the pixels are distributed within a wide range from a small pixel value to a large pixel value.

FIGS. 10(A) to 10(D) are views comparing the case where the pixel values of the threshold value or less are made zero and the case where they are not made zero in the image after the edge enhancement.

Figure 10:
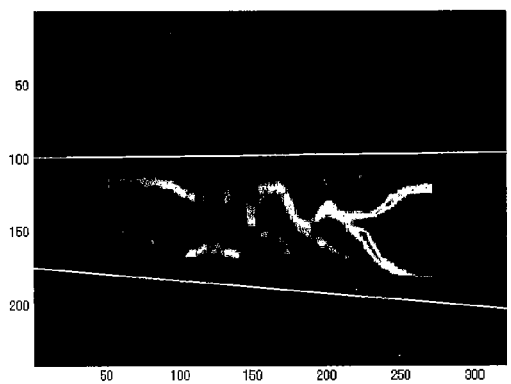
FIGS. 10(A) to 10(D) are views of a comparison between a case where pixel values of a threshold value or less are made zero and a case where they are not made zero in an image after edge enhancement.
Figure 10:
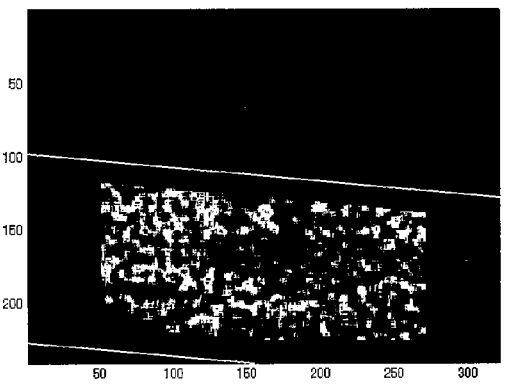
Figure 10:
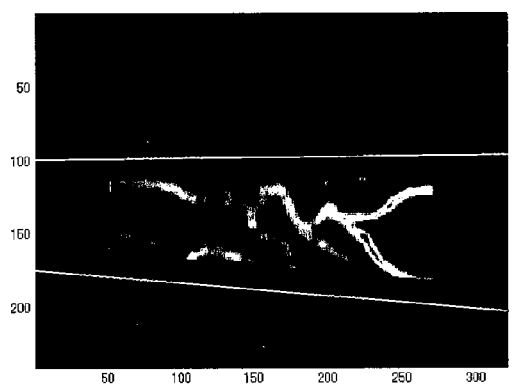
Figure 10:
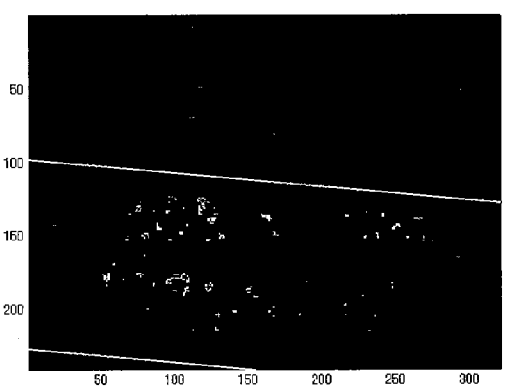

FIGS. 10(A) and 10(B) show images the same as FIGS. 8(C) and 8(D), that is, images in the case where the pixel values of the threshold value or less are not made zero.

FIGS. 10(C) and 10(D) show images where all of the pixel values of the threshold value "255" or less included in the images of FIGS. 10(A) and 10(B) are made zero.

When the captured image includes the object FG, as seen from the comparison of FIGS. 10(A) and 10(C), even if making the pixel values of the threshold value or less zero, the principal characteristics of the edges, that is, the images of the blood vessels, are maintained. Contrary to this, when the captured image does not include the object FG, as seen from the comparison of FIGS. 10(B) and 10(D), the majority of the edges disappear and the characteristics of edges largely change when making the pixel values of the threshold value or less zero.

Figure 11:
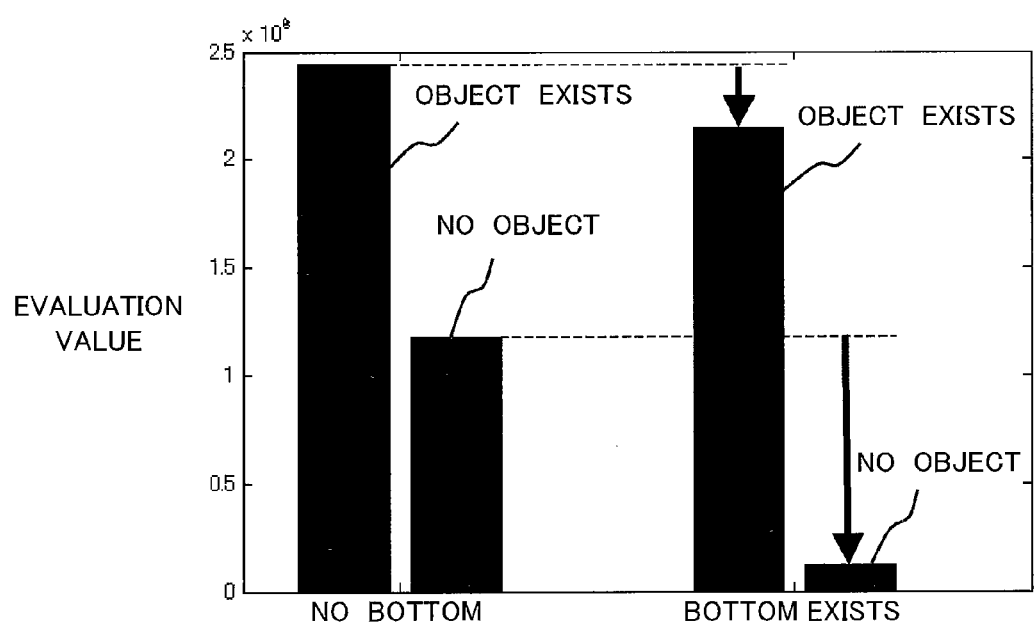
FIG. 11 is a diagram of a comparison between an evaluation value in a case where pixel values of a predetermined threshold value or less are made zero and an evaluation value in a case where a threshold value is not provided in the image shown in FIG. 10.

FIG. 11 is a diagram comparing the evaluation value (sum of pixel values) when the pixel values of the threshold value "255" or less are made zero and the evaluation value when no threshold value is provided in the images shown in FIGS. 10(A) to 10(D).

When no threshold value is provided, the evaluation value Ev of the image including the object FG (FIG. 10(A)) became "2434244", and the evaluation value Ev of the image not including the object (FIG. 10(B)) became "1177685". Contrary to this, when the pixel values of the threshold value "255" or less were made zero, the evaluation value Ev of the image including the object FG (FIG. 10(C)) became "2145659", and the evaluation value Ev of the image not including the object FG (FIG. 10(D)) became "117921". As apparent from this FIG. 11, by calculating the evaluation value Ev by eliminating pixel values of the predetermined threshold value or less in the image after the edge enhancement, the difference of evaluation values Ev in accordance with existence of the object FG can be made clearer.

Judgment Unit

The judgment unit 106 judges whether or not the mask prepared in the mask preparation unit 102 is suitably cutting out the image of the object FG based on the evaluation value Ev acquired at the evaluation value acquisition unit 105. For example, it compares the predetermined threshold value and the evaluation value Ev and judges whether or not the images of the blood vessels are cut out in accordance with the result of the comparison.

Registration Unit

When it is judged at the judgment unit 106 that the mask prepared at the mask preparation unit 102 suitably cuts out the image of the object FG, the registration unit 107 uses this mask to mask the captured image, extracts the information of the blood vessel patterns from the masked image, and stores this in the storage unit 60 as the template DAT.

Further, the registration unit 107 suspends the above template registration when the judgment unit 106 judged that the mask did not cut out the images of the blood vessels.

Comparison Unit

When the judgment unit 106 judged that the mask prepared at the mask preparation unit 102 suitably cut out the image of the object FG, the comparison unit 108 uses this mask to mask the captured image, extracts the information of the blood vessel patterns from the masked image, and compares this extracted information and the template DAT stored in the storage unit 60.

Further, when the judgment unit 106 judged that the mask did not cut out the images of the blood vessels, the comparison unit 108 suspends the above comparison.

A more detailed configuration of the mask preparation unit 102 will be explained.

Figure 12:
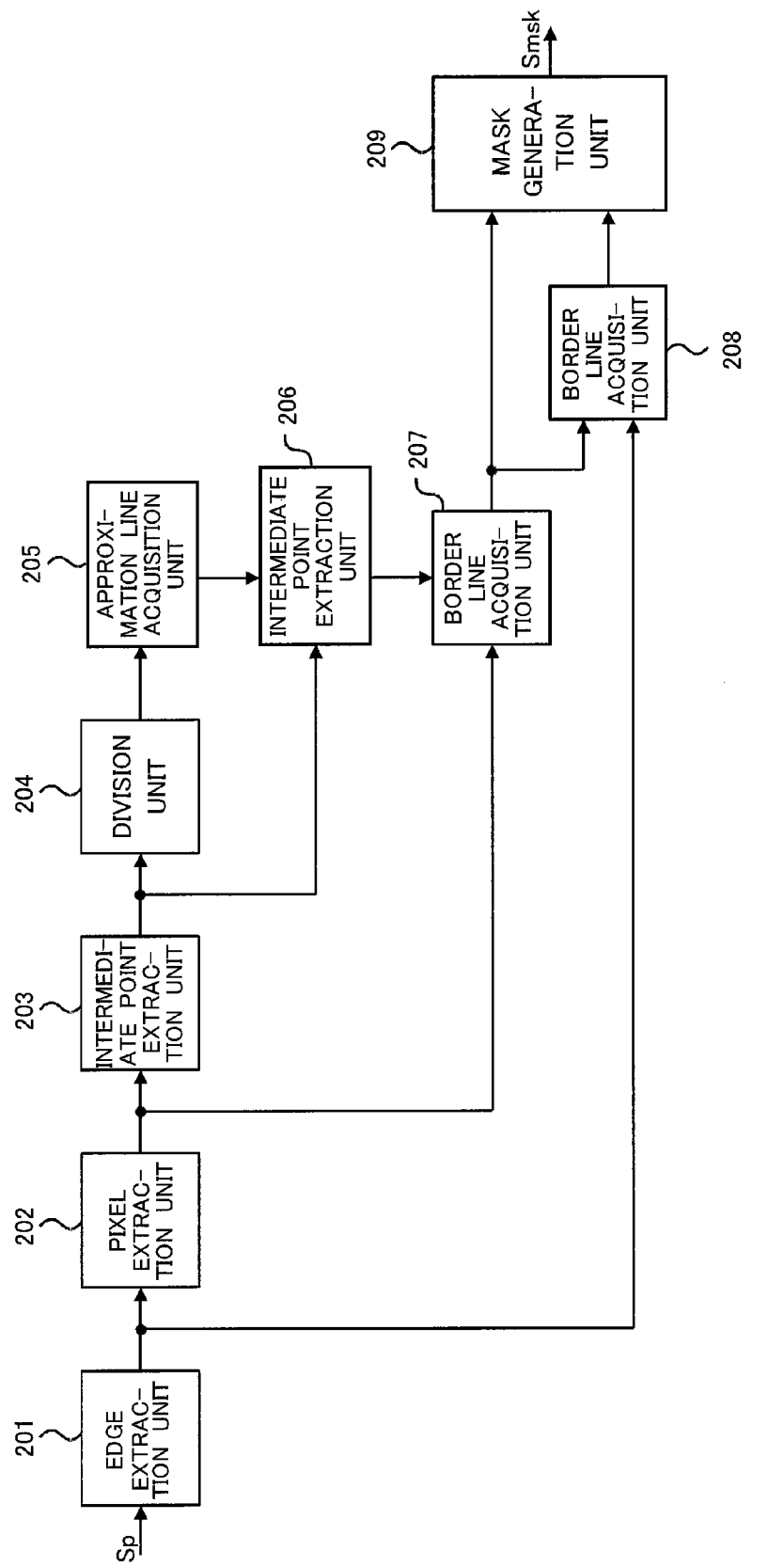
FIG. 12 is a diagram showing an example of the configuration of a mask preparation unit according to a first embodiment.

FIG. 12 is a view showing an example of the configuration of the mask preparation unit 102. The mask preparation unit 102 has an edge extraction unit 201, pixel extraction unit 202, intermediate point extraction unit 203, division unit 204, approximation line acquisition unit 205, intermediate point extraction unit 206, border line acquisition units 207 and 208, and mask generation unit 209.

The edge extraction unit 201 is an embodiment of the edge extraction unit and the edge extracting means of the present invention.

The pixel extraction unit 202 is an embodiment of the pixel extraction unit and the pixel extracting means of the present invention.

The intermediate point extraction unit 203 is an embodiment of the first intermediate point extraction unit and the first intermediate point extracting means of the present invention.

The division unit 204 is an embodiment of the division unit and the dividing means of the present invention.

The approximation line acquisition unit 205 is an embodiment of the approximation line acquisition unit and the approximation line acquiring means of the present invention.

The intermediate point extraction unit 206 is an embodiment of the second intermediate point extraction unit and the second intermediate point extracting means of the present invention.

The border line acquisition unit 207 is an embodiment of the first border line acquisition unit and the first border line acquiring means of the present invention.

The border line acquisition unit 208 is an embodiment of the third border line acquisition unit and the third border line acquiring means of the present invention.

Edge Extraction Unit

The edge extraction unit 201 extracts the edges of a captured image Sp acquired at the image acquisition unit 101. It is possible to use various techniques for the extraction of edges, but here, as an example, an example of utilizing a "sobel operator" to extract the pixels of the edges will be explained. A "sobel" operator is an operator for general purpose edge extraction having noise tolerance. Two filters $f_H$ and $f_G$ shown in the following equations are applied with respect to an image I covered by the edge extraction.

$$f_H = \begin{bmatrix} -1 & 0 & 1 \\ -2 & 0 & 2 \\ -1 & 0 & 1 \end{bmatrix} \quad (1)$$

$$f_G = \begin{bmatrix} -1 & -2 & -1 \\ 0 & 0 & 0 \\ 1 & 2 & 1 \end{bmatrix} \quad (2)$$

[Equations 1]

When the pixel values calculated by the filters $f_H$ and $f_G$ are "$g_H$" and "$g_V$", the edge evaluation value g becomes as follows.

[Equation 2]

$$g = \sqrt{g_H^2 + g_V^2} \quad (3)$$

When the edge evaluation value g of a certain pixel is larger than the predetermined threshold value $g_{thr}$, this pixel is judged as a pixel composing an edge (hereinafter called as an "edge pixel"). When it is smaller than the threshold value $g_{thr}$, it is judged not to be an edge pixel.

Pixel Extraction Unit

The pixel extraction unit 202 extracts the string of edge pixels (string of first pixels) predicted to form the contour of the top side of the object FG from the image with edges extracted at the edge extraction unit 201 and the string of edge pixels (string of second pixels) predicted to form the contour of the bottom side of the object FG.

In the following description, the position of each pixel on the plane of the image is expressed by Cartesian coordinates. Further, as expressed by the numerical values arranged alongside the images in for example FIGS. 2, the coordinate axis horizontally extending along the edge of the top side of each image is defined as the x-axis, and the coordinate axis vertically extending along the edge of the left side of each image is defined as the y-axis.

When defining the coordinate axes in this way, on the image plane, two types of reference lines (first reference line and second reference lines) acting as the reference at the time of pixel extraction are set.

The first reference line is set so as to pass through the inside of the image of the object FG when the imaging is carried out under usual conditions. For example, it is set to the line passing near the center of the y-coordinate of the image and parallel to the x-axis.

There are a plurality of second reference lines. Each of these is set to a line parallel to the y-axis. The plurality of second reference lines are preferably arranged at constant intervals.

When assuming that the reference lines as described above are set, the pixel extraction unit 202 extracts the edge pixels which are located on the second reference lines explained above among the edge pixels included in the region above the first reference line (first region) and, when there are a plurality of edge pixels on the same second reference lines, which are nearest the first reference line among these as the first pixels. Further, it extracts the edge pixels which are located on the second reference lines among edge pixels included in the region below the first reference line (second region) and, when there are a plurality of edge pixels on the same second reference lines, which are nearest the first reference line among these as the second pixels.

For example, the pixel extraction unit 202 sequentially searches for the edge pixels in the top direction and the bottom direction from the intersecting points of the first reference line and the second reference lines and extracts the edge pixels found first in the top direction as the first pixels and the edge pixels found first in the bottom direction as the second pixels.

The first pixels and second pixels extracted by the pixel extraction unit 202 for each of the second reference lines as described above form strings of pixels arranged in the x-axis direction. The string of first pixels corresponds to the contour of the top side of the object FG, and the string of second pixels corresponds to the contour of the bottom side.

Intermediate Point Extraction Unit

The intermediate point extraction unit 203 extracts a string of intermediate points located between the first pixels and the second pixels on each of the plurality of second reference lines explained above. The intermediate points extracted by the intermediate point extraction unit 203 have distances from the first pixels and distances from the second pixels located on the same second reference lines in a predetermined ratio. In the following example, it is assumed that these intermediate points are at equal distances from the first pixels and the second pixels located on the same second reference lines.

When the pixel extraction unit 202 could not extract one or both of the first pixels and the second pixels in part of the plurality of second reference lines, the intermediate point extraction unit 203 interpolates the intermediate points of that part of the second reference lines based on the intermediate points extracted at the other second reference lines adjacent to the part of the second reference lines. For example, when the intermediate point cannot be extracted on a certain second reference line, if there is an intermediate point extracted at the second reference line adjacent to that, the intermediate point is interpolated to a position of the same y-coordinate as that.

Division Unit

The division unit 204 divides the string of the intermediate points extracted at the intermediate point extraction unit 203 into one or more sections in which adjacent intermediate points are within the predetermined distance. Namely, the division unit 204 divides the extracted string of intermediate points so that one section is formed by a continuous series of intermediate points.

Approximation Line Acquisition Unit

The approximation line acquisition unit 205 acquires an approximation line of the string of intermediate points extracted at the intermediate point extraction unit 203 based on intermediate points belonging to the longest section divided at the division unit 204. For example, the least square method etc. is used to find a first order approximation function (or second or more order approximation function) suitable for the string of intermediate points forming the longest section.

Intermediate Point Extraction Unit

The intermediate point extraction unit 206 extracts a string of intermediate points having an error within a predetermined range from the approximation line acquired at the approximation line acquisition unit 205 among the intermediate points extracted at the intermediate point extraction unit 203.

Border Line Acquisition Unit

The border line acquisition unit 207 acquires top and bottom border lines of a mask based on the intermediate points extracted at the intermediate point extraction unit 206 and the first pixels and second pixels extracted at the pixel extraction unit 202. Namely, it acquires the border line of the top side of the mask (first border line) based on the approximation line of the string of first pixels located on the same second reference lines as the string of intermediate points extracted at the intermediate point extraction unit 206 and acquires the border line of the bottom side of the mask (second border line) based on the approximation line of the string of second pixels located on the second reference lines.

For example, it acquires the line obtained by shifting the approximation line of the string of first pixels toward the first reference line by exactly a predetermined distance as the border line of the top side of the mask and acquires the line obtained by shifting the approximation line of the string of second pixels toward the first reference line by exactly a predetermined distance as the border line of the bottom side of the mask.

Further, the border line acquisition unit 207 may acquire the top side border line and the bottom side border line of the mask based on the intermediate points extracted at the intermediate point extraction unit 206 and the intervals of the first pixels and the second pixels located on the same second reference lines (width of finger) while sandwiching the extracted intermediate points therebetween.

For example, it may calculate the approximation line of the string of intermediate points extracted at the intermediate point extraction unit 206 and the function for approximating the intervals of the first pixels and the second pixels explained above by using the x-coordinate value as a variable and acquire the top and bottom border lines based on these.

Border Line Acquisition Unit

The border line acquisition unit 208 acquires the border lines for eliminating the portion at which the top and bottom contours of the object FG approach each other, that is, the portion of the finger tip, by the mask.

Figure 21:
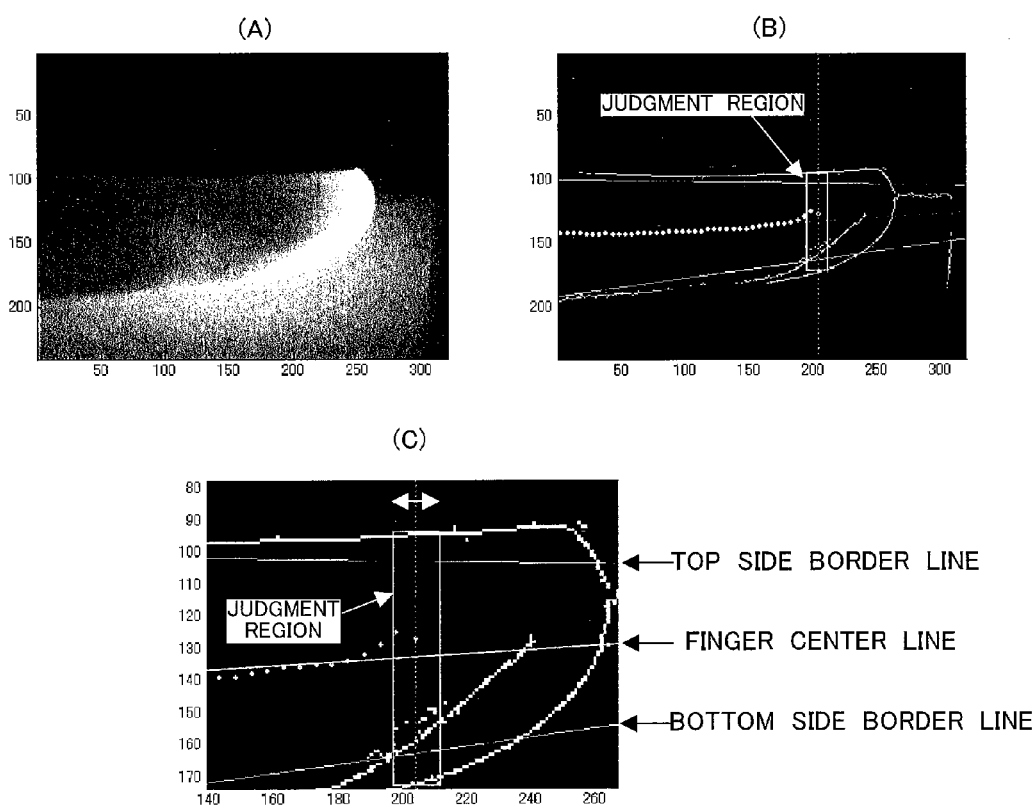
FIGS. 21(A) to 21(C) are views for explaining processing for acquiring left and right border lines.

The border line acquisition unit 208 sets the judgment region in order to judge the portion at which the top and bottom contours of the object FG approach each other. This judgment region is surrounded by two left and right sides parallel to the y-axis and two top and bottom sides parallel to the x-axis. The positions of the two top and bottom sides are determined so that a portion of the top side border line and a portion of the bottom side border line acquired at the border line acquisition unit 207 are included in both (see FIG. 21).

The border line acquisition unit 208 sequentially moves the judgment region described above from a predetermined position of the image (for example near the center) to the right side along the x-axis and counts the number of edge pixels included in the judgment region at each moved position. Then, at the position where this count reaches the predetermined threshold value, the line parallel to the y-axis passing through the judgment region is acquired as the right side border line of the mask.

The border line acquisition unit 208 may acquire the left side border line of the mask by the same method as that for the right side border line of the mask. Namely, it compares the count of edge pixels in the judgment region and the threshold value while performing the leftward movement of the judgment region and searches for the position where the count reaches the threshold value.

Mask Generation Unit

The mask generation unit 209 generates a mask image Smsk based on the top and bottom border lines acquired at the border line acquisition unit 207 and the left and right border lines acquired at the border line acquisition unit 208. For example, it generates a mask image setting values of pixels at the outside region of the border lines as "0" and setting values of pixels at the inside region of the border lines as "1". By performing an AND operation on this mask image Smsk and the image being processed, the inside region of the object FG included in the image being processed is cut out and the values of the pixels in the other regions become "0".

Figure 13:
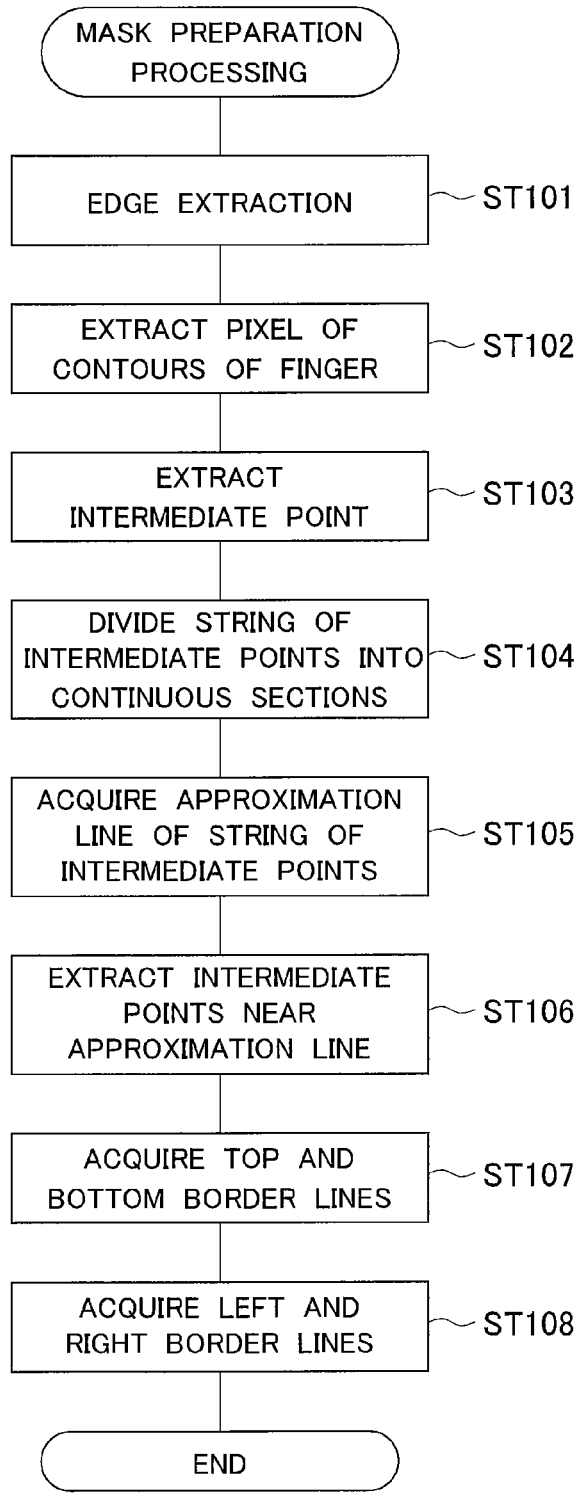
FIG. 13 is a flow chart showing an example of an operation for preparation of a mask at the image processing system according to the first embodiment.

The operation for preparing a mask in the image processing system according to the present embodiment having the above configuration will be explained with reference to the flow chart of FIG. 13.

Step ST101:

The edge extraction unit 201 extracts the edges of a captured image Sp.

Figure 14:
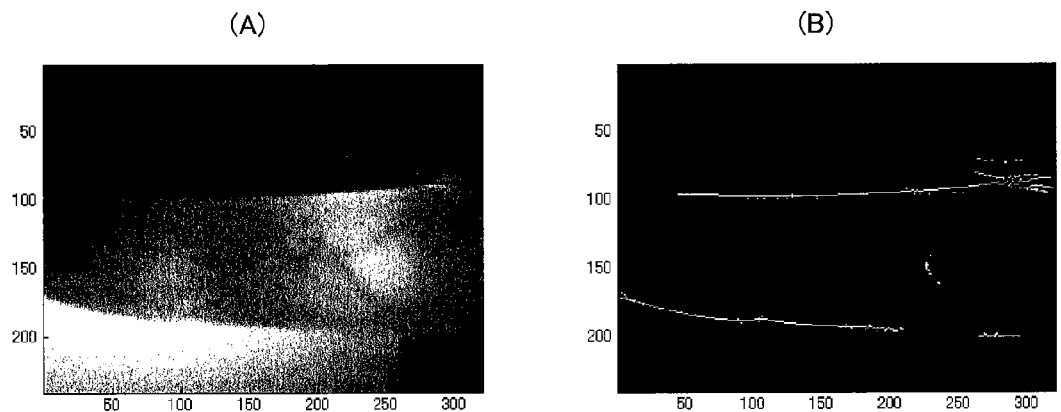
FIGS. 14(A) and 14(B) are views showing an example of an image whose edges are extracted by an edge extraction unit.

FIGS. 14(A) and 14(B) are views showing an example of an image with edges extracted by the edge extraction unit 201. FIG. 14(A) shows the captured image before the edge extraction. An image obtained by applying edge extraction by a "sobel" operator to this is illustrated in FIG. 14(B). In the image after the edge extraction, the contours of the finger are roughly extracted.

Step ST102:

When the edges of the captured image Sp are extracted, next, the pixel extraction unit 202 extracts the string of first pixels included in the region above the first reference line and the string of second pixels included in the region below this first reference line. The first pixels and second pixels are extracted one by one from each of the plurality of second reference lines. The first pixels are the edge pixels nearest the first reference line in the region above the first reference line on the second reference lines, and the second pixels are the pixels nearest the first reference line in the region below the first reference line on the second reference lines.

n number of second reference lines sequentially aligned from the center of the first reference line in the right direction are expressed as:

r0,r1,r2, . . . , rn−1;and m number of second reference lines sequentially aligned in the left direction from the center of the same first reference line are expressed as:

l0,l1,l2, . . . , lm−1.

The coordinates of the first pixel located on the right (i+1)th second reference line ri are expressed as:

$(x_{ri}, y^{d}_{ri})$;

and the coordinates of the second pixel located on the same second reference line ri are expressed as:

$(x_{ri}, y^{u}_{ri})$;

The coordinates of the first pixel located on the left (j+1)th second reference line lj are expressed as:

$(x_{lj}, y^{d}_{lj})$;

and the coordinates of the second pixel located on the same second reference line lj are expressed as:

$(x_{lj}, y^{u}_{lj})$.

The first pixels and second pixels are extracted by the pixel extraction unit 202 sequentially in the left direction and the right direction from for example near the center of the lateral width of the image.

When extracting the pixels in the right direction, first the second reference line r0 is selected. Edge pixels are sequentially searched for in the top and bottom directions from the intersecting point of the first reference line and the second reference line r0. The edge pixel found first on the top side is extracted as the first pixel $(x_{r0}, y^{d}_{r0})$, and the pixel found first on the bottom side is extracted as the second pixel $(x_{r0}, y^{u}_{r0})$.

When the pixels on the second reference line r0 finish being extracted, next, the second reference line r1 next to that on the right is selected, and edge pixels are sequentially searched for in the top and bottom directions from the intersecting point of this and the first reference line. The edge pixel found first on the top side is extracted as the first pixel $(x_{r1}, y^{d}_{r1})$, and the pixel found first on the bottom side is extracted as the second pixel $(x_{r1}, y^{u}_{r1})$.

Below, the same processing is carried out up to the right end second reference line rn−1, then the processing is sequentially carried out in the left direction from the center in the sequence of the second reference lines l0, l1, . . . , lm−1.

Step ST103:

After each first pixel and second pixel are extracted at the pixel extraction unit 202, the intermediate point extraction unit 203 extracts the intermediate point of the first pixel and the second pixel.

An intermediate point $C_{r0}$ located on the second reference line r0 is expressed as in the following equation based on the first pixel $(x_{r0}, y^{d}_{r0})$ and the second pixel $(x_{r0}, Y^{u}_{r0})$.

[Equation 3]

$$C_{r0}\left(x_{r0}, \frac{y^{u}_{r0} + y^{d}_{r0}}{2}\right) \quad (4)$$

The intermediate points are extracted at step ST103 parallel to for example the extraction of the first pixels and the second pixels at step ST102.

In parallel to the extraction of each intermediate point, the border line acquisition unit 207 calculates the distance between the first pixel and the second pixel (hereinafter called the "finger width") used in the later step ST107.

A finger width $W_{r0}$ on the second reference line r0 is expressed as in the following equation based on the first pixel $(x_{r0}, y^{d}_{r0})$ and the second pixel $(x_{r0}, y^{u}_{r0})$.

[Equation 4]

$$w_{r0} = y^{u}_{r0} - y^{d}_{r0} \quad (5)$$

The first pixels and the second pixels are not always extracted as pairs on all second reference lines. For example, when the contours of the object FG become unclear, there is a possibility that one or both of the first pixels and second pixels forming certain pairs will not exist in a portion of the second reference lines. In such case, the intermediate point extraction unit 203 interpolates the intermediate points of that portion of the second reference lines based on the intermediate points extracted on other second reference lines adjacent to the second reference lines of that portion.

Figure 15:
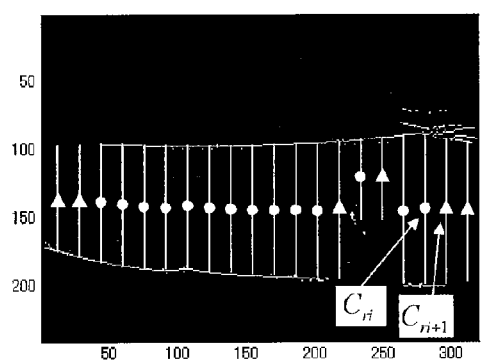
FIG. 15 is a view showing an example of processing for extraction of intermediate points performed with respect to an image after the edge extraction shown in FIGS. 14(A) and 14(B).

FIG. 15 is a view showing an example of the extraction of the intermediate points performed with respect to an image after the edge extraction shown in FIG. 14(B).

In FIG. 15, the dots indicate the intermediate points found from the coordinates of the two types of pixels (first pixels and second pixel), and the triangles indicate the intermediate points found by interpolation.

In the example of FIG. 15, the first pixel $(x_{ri+1}, y^d_{ri+1})$ is extracted on the second reference line ri+1, but the second pixel $(x_{ri+1}, y^u_{ri+1})$ is not extracted. On the other hand, on the second reference line r1 adjacent to that, both of the first pixel $(x_{ri}, y^d_{ri})$ and the second pixel $(x_{ri}, y^u_{ri})$ are extracted. In this case, the intermediate point extraction unit 203 interpolates the intermediate point $C_{ri+1}$ of the second reference line ri+1 to the point having the same y-coordinate as that of the intermediate point $C_{ri}$ of the second reference line ri.

[Equation 5]

$$C_{ri+1}\left(x_{ri+1}, \frac{y^u_{ri} + y^d_{ri}}{2}\right) \quad (6)$$

In this case, the finger width $W_{ri}$ on the second reference line ri+1 is interpolated as in the following equation based on the extracted first pixel $(x_{ri+1}, y^d_{ri+1})$ and the interpolated intermediate point $C_{ri+}$.

[Equation 6]

$$w_{ri+1} = 2 \times \left(y^u_{ri+1} - \frac{y^u_{ri} + y^d_{ri}}{2}\right) = 2y^u_{ri+1} - (y^u_{ri} + y^d_{ri}) \quad (7)$$

By the above processing, n number of intermediate points $C_{r0}, \ldots, C_{rn-1}$ and n number of finger widths $W_{r0}, \ldots, W_{rn-1}$ searched for in the right direction and m number of intermediate points $C_{l0}, \ldots, C_{lm-1}$ and m number of finger widths $W_{l0}, \ldots, W_{lm-1}$ searched for in the left direction are found.

They become as in the following equation when expressed arranged in the rising order of the x-coordinate values.

[Equation 7]

$$C_i = C_{lm-1}, C_{lm-2}, \ldots, C_{l0}, C_{r0}, C_{r1}, \ldots, C_{rn-2}, C_{rn-1} \quad (8)$$

$$w_i = w_{lm-1}, w_{lm-2}, \ldots, w_{l0}, w_{r0}, w_{r1}, \ldots, w_{rn-2}, w_{rn-1} \quad (9)$$

Step ST104:

When the string of intermediate points $(C_{lm-1}, \ldots, C_{l0}, C_{r0} \ldots, C_{rn-1})$ is extracted, next, the division unit 204 divides the string of intermediate points into continuous sections in order to differentiate the intermediate points clearly offset from the center line of the finger. Namely, it divides the string of intermediate points extracted at the intermediate point extraction unit 203 into one or more sections in which adjacent intermediate points exist within a predetermined distance.

When assuming that the second reference lines are aligned at equal intervals dx, the distance between two adjacent intermediate points $C_k$ and $C_{k+1}$ can be evaluated by the deviation $dy_k$ of the y-coordinate expressed by the following equation:

[Equation 8]

$$dy_k = |(C_{k+1})_y - (C_k)_y| \quad (10)$$

In the above equation, "$(C_k)_y$" represents the y-coordinate of the intermediate point $C_k$. When the deviation $dy_k$ of the y-coordinate is larger than a predetermined threshold value $dy_{thr}$, the continuous section is divided between the intermediate points $C_k$ and $C_{k+1}$.

Figure 16:
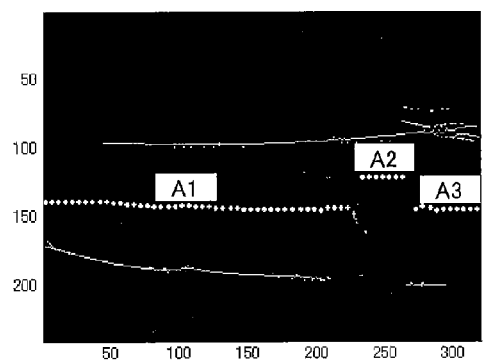
FIG. 16 is a view showing an example of division of a string of intermediate points shown in FIG. 15 to continuous sections by a division unit.

FIG. 16 is a view showing an example of the division of the string of intermediate points shown in FIG. 15 into continuous sections by the division unit 204. In the example of FIG. 16, it is divided into three continuous sections (A1, A2, and A3 in the order from the left).

Step ST105:

After the string of intermediate points $(C_{lm-1}, \ldots, C_{l0}, C_{r0}, \ldots, C_{rn-1})$ is divided into continuous sections, next, the approximation line acquisition unit 205 acquires the approximation line of the string of intermediate points $(C_{lm-1}, \ldots, C_{l0}, C_{r0}, \ldots, C_{rn-1})$ based on the intermediate points belonging to the longest section among the divided continuous sections (may be one). For example, the longest continuous section is defined as "P", and the approximation line of for example the first order function (line) is calculated based on the q-th intermediate point $C_q$ $(C_p, C_{p+1}, \ldots, C_{q-1}, C_q)$ from the p-th intermediate point $C_p$ forming that section.

Figure 17:
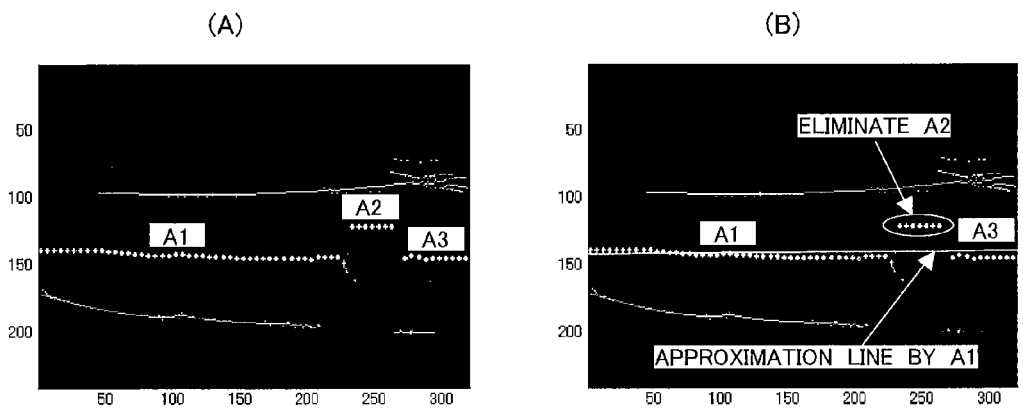
FIGS. 17(A) and 17(B) are first views showing an example of an approximation line for interpolating intermediate points.

FIG. 17 are views showing an example of the approximation line acquired by the approximation line acquisition unit 205. FIG. 17(A) shows the string of intermediate points divided into three continuous sections A1, A2, and A3, and FIG. 17(B) shows the approximation line acquired based on the longest section A1 among those.

Step ST106:

After the approximation line based on the longest continuous section of intermediate points is acquired at the approximation line acquisition unit 205, next, the intermediate point extraction unit 206 extracts a string of intermediate points having a difference from the approximation line acquired at the approximation line acquisition unit 205 within a predetermined range from among all intermediate points $(C_{lm-1}, \ldots, C_{l0}, C_{r0}, \ldots, C_{rn-1})$ extracted at the intermediate point extraction unit 203.

In the example of FIGS. 17(A) and 17(B), the edges representing the shape of the finger are relatively beautifully extracted, but another edge is extracted at the center portion of the finger, therefore erroneous recognition of the finger's shape occurs.

When such erroneous recognition occurs, the width of the finger is remarkably different from the other portion, or the center line of the finger is largely deviated from the actual state. Therefore, the intermediate point extraction unit 206 calculates the difference between the approximation line of the approximation line acquisition unit 205 estimated to relatively correctly represent the center line of the finger and each intermediate point extracted at the intermediate point extraction unit 203. Then, any intermediate point having a difference larger than the predetermined threshold value $dL_{thr}$ is regarded as an intermediate point not forming the center line of the finger and is eliminated from the candidates of the intermediate points used at the next step ST107.

In the example of FIG. 17(B), the continuous section A2 at the center portion is remarkably offset from the approximation line based on the continuous section A1 acquired at the approximation line acquisition unit 205. For this reason, the continuous section A2 at the center portion is eliminated by the intermediate point extraction unit 206 in this example, and just the other continuous sections A1 and A3 are extracted.

Step ST107:

After the string of intermediate points having a difference from the approximation line based on the longest continuous section within the predetermined range is extracted, next, the border line acquisition unit 207 acquires the border line on the top side of the mask (first border line) based on the approximation line of the string of first pixels located on the same second reference lines as the string of the intermediate points extracted at the intermediate point extraction unit 206 and acquires the border line on the bottom side of the mask (second border line) based on the approximation line of the string of second pixels located on the second reference lines.

Here, the string of Z number of intermediate points extracted by the intermediate point extraction unit 206 is re-expressed as:

$$C_0, C_1, \ldots, C_{z-1}; \text{and}$$

z number of finger widths corresponding to these are re-expressed as:

$$Z_0, C_1, \ldots, C_{Z-1}.$$

The border line acquisition unit 207 finds the approximation line of the center of finger (for example first order function) based on these Z number of intermediate points and, at the same time, finds the approximation function of the finger width (for example the first order function) using the x-coordinate as the variable based on the Z number of finger widths.

Figure 18:
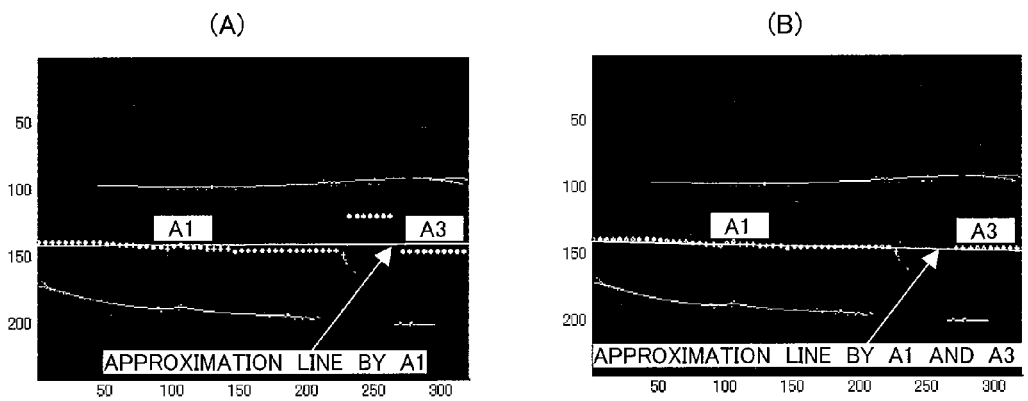
FIGS. 18(A) and 18(B) are second views showing an example of an approximation line for interpolating intermediate points.

FIG. 18(A) shows the approximation line acquired based on only intermediate points of the longest continuous section, and FIG. 18(B) shows the approximation line acquired based on intermediate points extracted at the intermediate point extraction unit 206.

As seen from the comparison of the two, by acquiring the approximation line based on the intermediate points extracted at the intermediate point extraction unit 206, the error between the intermediate points and the approximation line can be made smaller as a whole in comparison with the case where the approximation line is acquired based on only the intermediate points of the longest continuous section.

Figure 19:
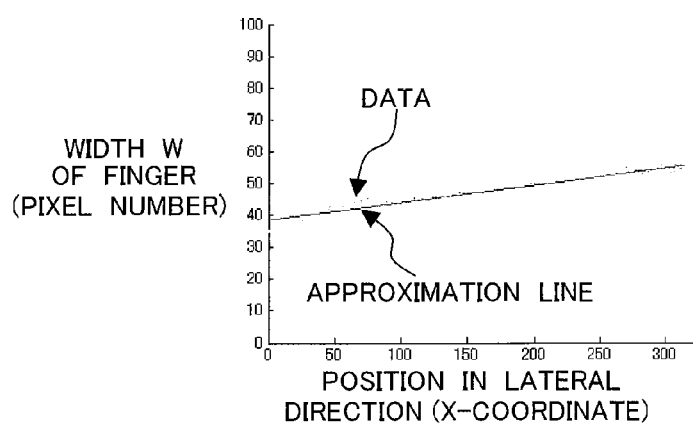
FIG. 19 is a diagram showing an example of an approximation function of a finger width using an x-coordinate as a variable.

FIG. 19 is a diagram showing an example of an approximation function (first order function) of the finger width acquired based on Z number of finger widths corresponding to Z number of intermediate points extracted at the intermediate point extraction unit 206.

After the approximation line of the string of intermediate points and the approximation function of the finger widths are found as explained above, the border line acquisition unit 207 acquires the top and bottom border lines of the mask based on these approximations.

When the value of the x-coordinate is "i" (i=0, ..., 319), if the y-coordinate of an intermediate point obtained by the above approximation computation is "$C_{Fi}$", the y-coordinate of the finger width is "$w_{Fi}$", the y-coordinate of the top side contour of the finger is "$E_{Di}$", and the y-coordinate of the bottom side contour of the finger is "$E_{Ui}$", the relationships of the following equations stand.

[Equation 9]

$$E_{Di} = C_{Fi} - \frac{w_{Fi}}{2} \quad (11)$$

$$E_{Ui} = C_{Fi} + \frac{w_{Fi}}{2} \quad (12)$$

Figure 20:
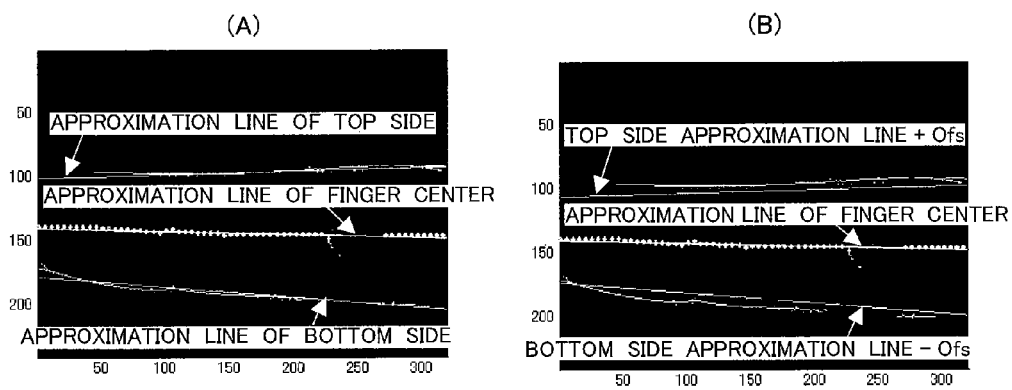
FIGS. 20(A) and 20(B) are views showing an example of border lines of a mask acquired in a border line acquisition unit.

FIG. 20(A) is a view plotting the approximation line of the top side contour (y-coordinates near "100") of the finger and the approximation line of the bottom side contour (y-coordinates near "200") found based on equations (11) and (12).

The approximation line of FIG. 20(A) matches with the contour of the finger well, but when this is used as it is for the border line of the mask, there is a possibility that the images of the blood vessels will be influenced by the strong edge appearing on the contour. Therefore, equations (11) and (12) are corrected so as to shift the approximation line of the top side contour of the finger in the down direction by exactly a predetermined offset Ofs and shift the approximation line of the bottom side contour of the finger in the up direction by exactly the offset Ofs.

[Equation 10]

$$E_{Di} = C_{Fi} - \frac{w_{Fi}}{2} + Ofs \quad (13)$$

$$E_{Ui} = C_{Fi} + \frac{w_{Fi}}{2} - Ofs \quad (14)$$

The border line acquisition unit 207 acquires approximation lines based on for example these equations (13) and (14) as top and bottom border lines of the mask. By these border lines, it becomes possible to cut out the image in the portion inside the top and bottom contours of the finger.

Step ST108:

After the top and bottom border lines of the mask are acquired by the above processing, next, the border line acquisition unit 208 acquires the left and right border lines for eliminating the parts outside from the finger tip.

FIGS. 21(A), 21(B), and 21(C) are views for explaining the processing for acquiring the left and right border lines at the border line acquisition unit 208. FIG. 21(A) shows a captured image including the finger tip. FIG. 21(B) shows the image obtained by applying the edge extraction to this captured image, and FIG. 21(C) is a view obtained by enlarging the principal portion of FIG. 21(B).

The border line acquisition unit 208 sets the judgment region as shown in FIGS. 21(B) and 21(C) in order to judge the portion at which the top and bottom contour lines of the finger approach each other. This judgment region is surrounded by two left and right sides parallel to the y-axis and two top and bottom sides parallel to the x-axis.

The center of the judgment region is set at for example the intermediate points approximated at the border line acquisition unit 207. The left and right sides of the judgment region are separated from the center point (i, $C_{Fi}$) in the x-axis direction by exactly the predetermined distances dx. Further, the top and bottom sides of the judgment region are separated from the intermediate points (i, $C_{Fi}$) by exactly half of the finger width $w_{Fi}$ approximated at the border line acquisition unit 207 plus the predetermined distance dy, that is "dy+($w_{Fi}$)/2".

In this way, the set judgment region includes a portion of the top side border line and a portion of the bottom side border line acquired at the border line acquisition unit 207 as shown in FIGS. 21(B) and 21(C).

The center (i, $C_{Fi}$) of the judgment region is sequentially moved to the right side along the x-axis from a predetermined position of the image (for example, near the center). At each position, the number of edge pixels included in the judgment region set as described above is counted. A line parallel to the y-axis passing through the judgment region at the position where this count reaches a predetermined threshold value (for example, a line passing through the center (i, $C_{Fi}$) of the judgment region) is acquired as the right side border line of the mask.

The left side border line of the mask can also be acquired by the same processing as that for the right side border line.

As explained above, according to the present embodiment, first, the edges of the captured image are extracted. Then, the edge pixels included in the region on the top side of the first reference line set so as to pass through the inside of the image of the object FG, located on the parallel plurality of second reference lines (lm−1, . . . , l0, r0, . . . , rn−1), and located at the positions nearest the first reference line on these second reference lines are extracted as the first pixels. Further, in parallel to this, the edge pixels included in the region on the bottom side of the first reference line, located on the second reference lines (lm−1, . . . , l0, r0, . . . , rn−1), and located at the positions nearest the first reference line on these second reference lines are extracted as the second pixels.

After the first pixels and the second pixels are extracted in this way, next, the string of intermediate points ($C_{lm-1}$, . . . , $C_{l0}$, $C_{r0}$, . . . , $C_{rn-1}$) located between the first pixels and the second pixels on the second reference lines (lm−1, . . . , l0, r0, . . . , rn−1), and in which the distances from the first pixels and the distances from the second pixels have a predetermined ratio is extracted.

This string of intermediate points ($C_{lm-1}$, . . . , $C_{l0}$, $C_{r0}$, . . . , $C_{rn-1}$) is divided into one or more sections in which adjacent intermediate points exist within a predetermined distance. Then, the approximation line of the string of intermediate points ($C_{lm-1}$, . . . , $C_{l0}$, $C_{r0}$, . . . , $C_{rn-1}$) is acquired based on the intermediate points forming the divided longest section.

Then, from the original string of intermediate points ($C_{lm-1}$, . . . , $C_{l0}$, $C_{r0}$, . . . , $C_{rn-1}$), the string of z number of intermediate points ($C_0$, . . . , $C_{z-1}$) having a difference from the above approximation line within the predetermined range is extracted.

Then, based on the approximation line of the string of the first pixels located on the same second reference lines as the string of z number of intermediate points ($C_0$, . . . , $C_{z-1}$), the border line on the top side of the mask is acquired, and based on the approximation line of the string of the second pixels located on the second reference lines, the border line on the bottom side of the mask is acquired.

In this way, the strings of pixels corresponding to the contours of the object are extracted from the edge extracted image, and the border lines of the mask are acquired based on the approximation lines thereof, therefore, the mask can be prepared by simple processing in comparison with the method of binarization of the image while adjusting the threshold value for each captured image.

According to the above embodiment, the region surrounded by two sides parallel to the first reference line and two sides parallel to the second reference lines and including a portion of the first border line and a portion of the second border line in the inside thereof is sequentially moved in one direction parallel to the first reference line from a predetermined position on the captured image, and at each moved position, the number of edge pixels included in the region is counted. Then, the line parallel to the second reference line passing through the region at the position where the count reaches the predetermined threshold value is acquired as the border line of the mask.

Due to this, even when there is a portion which is not straight, but has a complex shape (for example, the finger tip) in the contours of the object, the border lines for cutting out the inside of the contours can be acquired without approximation, therefore the processing can be simplified and speeded up.

According to the embodiment explained above, the edges of the captured image are enhanced, and, in the image after this edge enhancement, an evaluation value concerning the intensity and/or amount of the edges included in the region is acquired based on values of pixels included in the region further inside of the object cut out by the mask. Then, based on the acquired evaluation value, it is judged whether or not the mask suitably cut out the image of the object.

Accordingly, for example the case where the finger is separated from the system while the template registration or the authentication is carried out or otherwise when the object image being processed is not included in the captured image can be accurately judged. Due to this, wasteful execution of various types of processing (template registration, comparison, etc.) after the masking can be stopped, therefore the power consumption can be reduced.

Second Embodiment

A second embodiment of the present invention will be explained next.

In the image processing system according to the second embodiment of the present invention, the positions of the border lines of the object are estimated based on the distribution of edge pixels.

Figure 22:
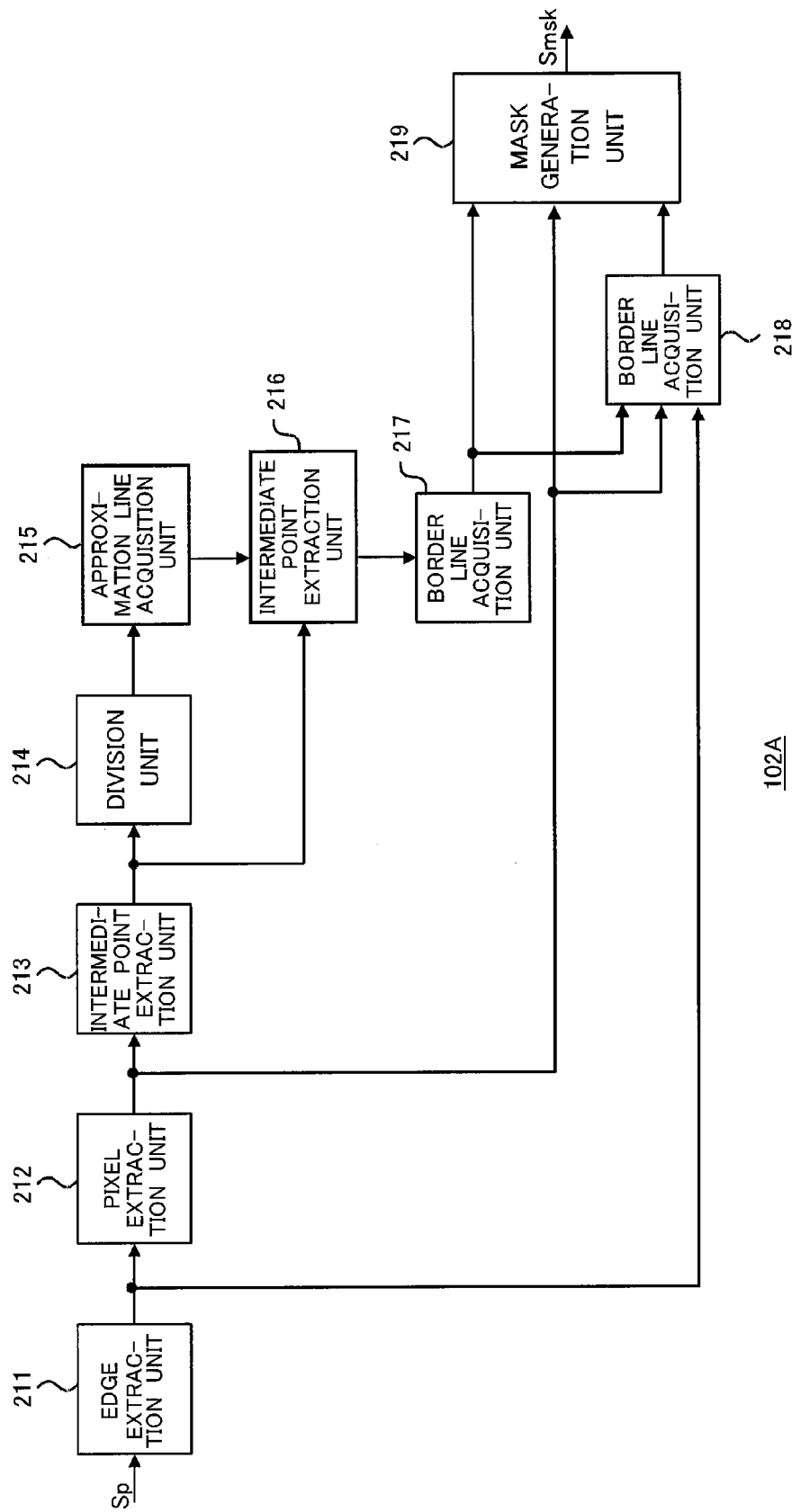
FIG. 22 is a view showing an example of the configuration of a mask generation unit at the image processing system according to a second embodiment.

FIG. 22 is a diagram showing an example of the configuration of a mask preparation unit 102A in the image processing system according to the present embodiment. The mask preparation unit 102A has an edge extraction unit 211, border line acquisition unit 212, pixel extraction unit 213, division unit 214, approximation line acquisition unit 215, pixel extraction unit 216, border line acquisition units 217 and 218, and mask generation unit 219.

The edge extraction unit 211 is an embodiment of the edge extraction unit and the edge extracting means of the present invention.

The border line acquisition unit 212 is an embodiment of the second border line acquisition unit and the second border line acquiring means of the present invention.

The pixel extraction unit 213 is an embodiment of the first pixel extraction unit and the first pixel extracting means of the present invention.

The division unit 214 is an embodiment of the division unit and the dividing means of the present invention.

The approximation line acquisition unit 215 is an embodiment of the approximation line acquisition unit and the approximation line acquiring means of the present invention.

The pixel extraction unit 216 is an embodiment of the second pixel extraction unit and the second pixel extracting means of the present invention.

The border line acquisition unit 217 is an embodiment of the first border line acquisition unit and the first border line acquiring means of the present invention.

The border line acquisition unit 218 is an embodiment of the third border line acquisition unit and the third border line acquiring means of the present invention.

The image processing system according to the present embodiment replaces the mask preparation unit 102 in the image processing system 1 shown in FIG. 1 with the mask preparation unit 102A shown in FIG. 22. The rest of the configuration is the same as that of the image processing system shown in FIG. 1.

Below, components of the mask preparation unit 102A shown in FIG. 22 will be explained.

Edge Extraction Unit

The edge extraction unit 211 is the same component as the previously explained edge extraction unit 201 and extracts the edges of a captured image Sp by using for example a "sobel operator".

Border Line Acquisition Unit

The border line acquisition unit 212 moves the strip shaped region sandwiched by the two parallel sides in parallel with respect to the y-axis of the image and counts the edge pixels included in the region at each position of movement. Then, it acquires the border line of the top side of the mask in accordance with the line parallel to the above sides included in the region at the position where the count becomes the largest.

Pixel Extraction Unit

The pixel extraction unit 213 extracts the string of edge pixels predicted to form the contour of the bottom side of the object FG from the image from which the edges are extracted at the edge extraction unit 211. Namely, the pixel extraction unit 213 extracts edge pixels included in the region below the border line of the top side of the mask acquired at the border line acquisition unit 212, located on a predetermined plurality of second reference lines, and located at the positions nearest the first reference line on the second reference lines.

For example, the pixel extraction unit 213 sequentially searches for edge pixels in the down direction from the intersecting point of the top side border line of the mask and the second reference lines and extracts the first found edge pixels.

The edge pixels extracted by the pixel extraction unit 213 for the second reference lines as described above form the string of edge pixels aligned in the x-axis direction. This corresponds to the contour line of the bottom side of the object FG.

Division Unit

The division unit 214 divides the string of edge pixels extracted at the pixel extraction unit 213 into one or more sections in which adjacent edge pixels are within a predetermined distance from each other. Namely, the division unit 214 divides the extracted string of edge pixels so that a set of sections are formed by continuously linked edge pixels.

Approximation Line Acquisition Unit

The approximation line acquisition unit 215 acquires an approximation line of the string of edge pixels extracted at the pixel extraction unit 213 based on edge pixels belonging to the longest section divided at the division unit 214. For example, the least square method etc. is used to find the first order approximation function (or second or higher order approximation function) suitable for the string of edge pixels forming the longest section.

Pixel Extraction Unit

The pixel extraction unit 216 extracts the string of edge pixels having a difference from the approximation line acquired at the approximation line acquisition unit 215 within a predetermined range among the edge pixels extracted at the pixel extraction unit 213.

Border Line Acquisition Unit

The border line acquisition unit 217 acquires the border line of the bottom side of the mask based on the approximation line of the string of edge pixels extracted at the pixel extraction unit 216.

For example, it acquires the line obtained by shifting the approximation line of the string of edge pixels extracted at the pixel extraction unit 216 toward the border line of the top side of the mask by exactly a predetermined distance as the border line of the bottom side of the mask.

Border Line Acquisition Unit

The border line acquisition unit 218 acquires the border line for eliminating the portion in which the top and bottom contours of the object FG approach each other, that is, the portion of the finger tip, by the mask by the same operation as that of the previously explained border line acquisition unit 208.

Mask Generation Unit

The mask generation unit 219 generates the mask image Smsk having border lines acquired at the border line acquisition units 212, 217, and 218 by the same operation as that of the previously explained mask generation unit 209.

Figure 23:
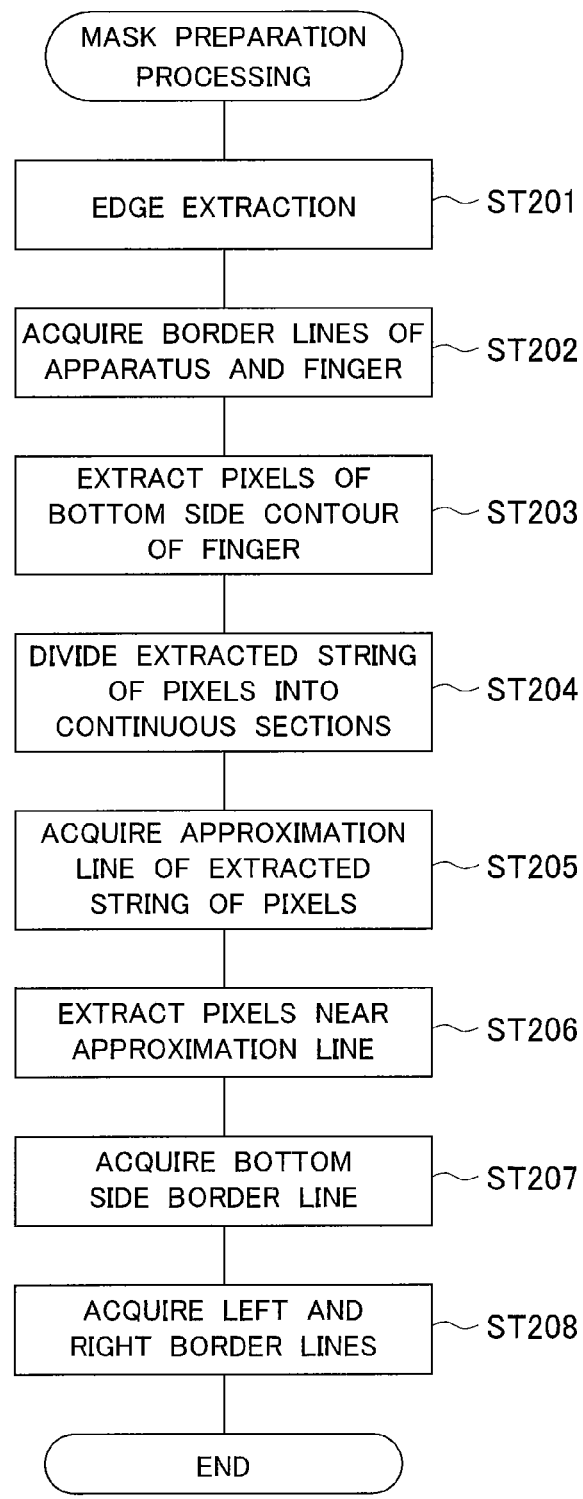
FIG. 23 is a flow chart showing an example of an operation for preparation of a mask at the image processing system according to the second embodiment.

The operation for preparation of the mask in the image processing system according to the present embodiment having the above configuration will be explained with reference to the flow chart of FIG. 23.

Step ST201:

The edge extraction unit 201 extracts the edges of a captured image Sp.

Step ST202:

After the edges of the captured image Sp are extracted, next, the border line acquisition unit 212 acquires the border line of the top side of the object FG.

Figure 24:
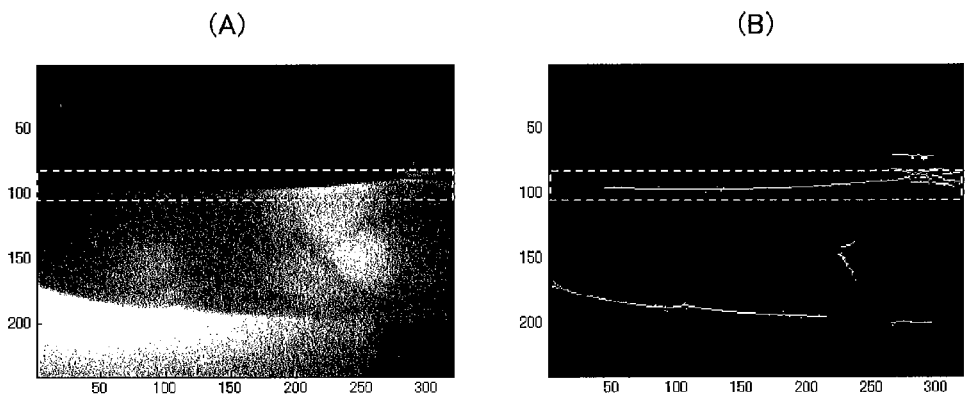
FIGS. 24(A) and 24(B) are views showing an example of a captured image including a contact surface of an imaging apparatus and an object and the image after edge extraction thereof.

FIGS. 24(A) and 24(B) are views showing an example of the captured image and the image after the edge extraction thereof.

In FIGS. 24(A) and 24(B), regions surrounded by dotted lines are contact surfaces of the imaging apparatus with the finger. In the example of the figures, the finger is not in the region above this contact surface (region where the y-coordinates are small).

In the example illustrated in FIGS. 24(A) and 24(B), the contact surface of the imaging apparatus and the finger is flat and not influenced by the shape of the finger. Further, the contact surface is substantially horizontal to the x-axis direction of the captured image. In the edge extracted image, the edge pixels of the contact surface are aligned in the direction horizontal to the x-axis. Therefore, the border line acquisition unit 212 performs the processing for acquiring the border line corresponding to this contact surface as the line horizontal to the x-axis.

When the pixels forming the edge of the contact surface are aligned in the direction substantially horizontal to the x-axis, when counting the number of edge pixels for each y-coordinate, the number of edge pixels abruptly becomes large at the position of the contact surface. Accordingly, based on the position where the number of edge pixels for the y-coordinate becomes the maximum, it is possible to detect the border line of the contact surface.

Note that when the contour of the bottom side of the finger (region where the y-coordinates are large) becomes remarkably flat, there is a possibility that the count will become the maximum on not the contact surface, but the bottom side contour. When the distribution of the number of pixels has peaks at positions of the top and bottom contours in this way and which peak is formed by the contact surface cannot be estimated by just the count w, it is necessary to previously grasp between which of the top and bottom the contact surface of the imaging apparatus and the finger exists at.

In the example of FIGS. 24(A) and 24(B), the contour of the top side of the image is the contact surface of the apparatus and the finger.

FIGS. 25(A) and 25(B) are views showing an example of the distribution of the edge pixels for the y-coordinates.

FIG. 25(A) shows the image after the edge extraction, and FIG. 25(B) shows the distribution obtained by counting the number of edge pixels included in this image for the y-coordinates. The line of the y-coordinate where the number of the edge pixels becomes the maximum and the contour of the edge formed by the contact surface coincide well.

Figure 25:
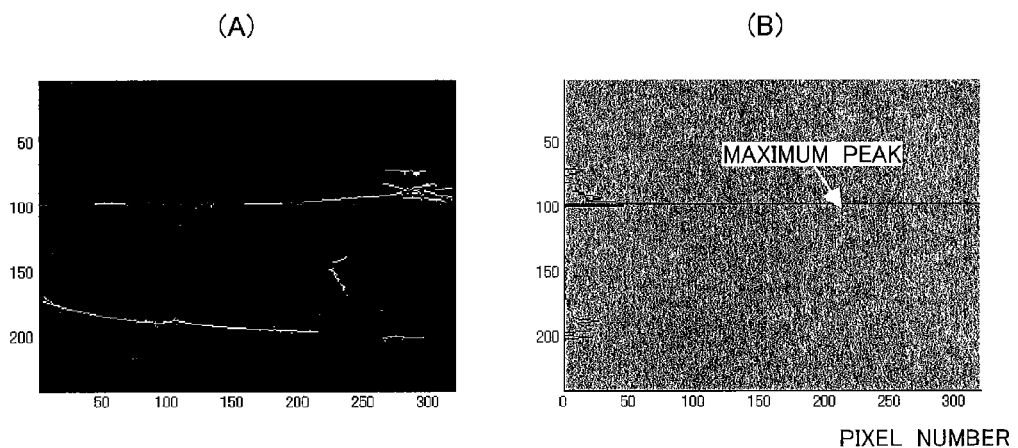
FIGS. 25(A) and 25(B) are views showing an example of the distribution of the edge pixels for each y-coordinate.

However, when viewing the distribution of FIG. 25(B), the change of the number of pixels becomes very sharp. The contact surface can be detected well in this example, but in a case where the contact surface becomes slightly inclined etc., the peak of the maximum value no longer beautifully appears in the distribution and there is a possibility of erroneously extracting the edge of the contact surface. Therefore, in the border line acquisition unit 212 according to the present embodiment, the number of pixels is not found for each y-coordinate as shown in FIG. 25, but the edge pixels included in the region having a certain degree of width, that is, the region including coordinates before and after a noted y-coordinate (the strip shaped region parallel to the x-axis) are counted.

FIGS. 26(A) and 26(B) are views illustrating an example of the region for counting the edge pixels.

The region surrounded by dotted lines in FIG. 26(A) indicates the region for counting the edge pixels. Further, FIG. 26(B) is a diagram enlarging the region surrounded by a circle in FIG. 26(A).

In the example of FIGS. 26(A) and 26(B), the region having a width $d_y$ ($d_y=5$) before and after a noted y-coordinate (y=100) is set as the region for counting the edge pixels. That is, the number of edge pixels included in the following region is counted:

$$100-d_y \leq y \leq 100+d_y$$

By imparting the width to the counting range in this way, even when a slight disturbance occurs in the edge extracted image, it becomes possible to stably find the position of the contact surface.

Figure 26:
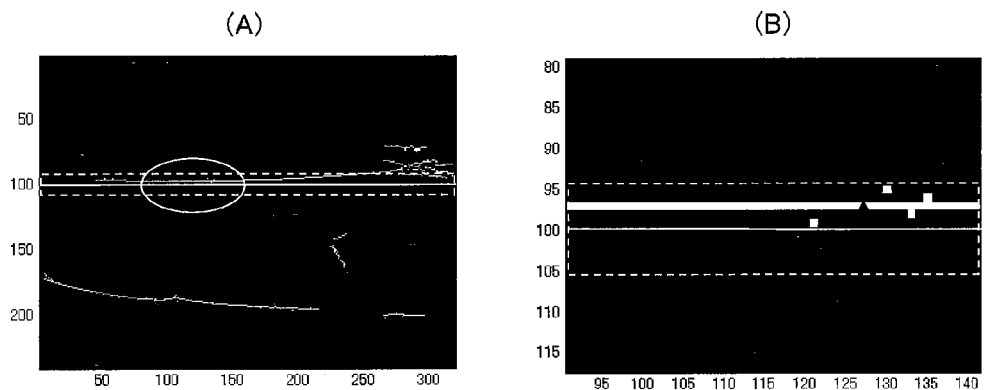
FIGS. 26(A) and 26(B) are views illustrating an example of a region for counting edge pixels.
Figure 27:
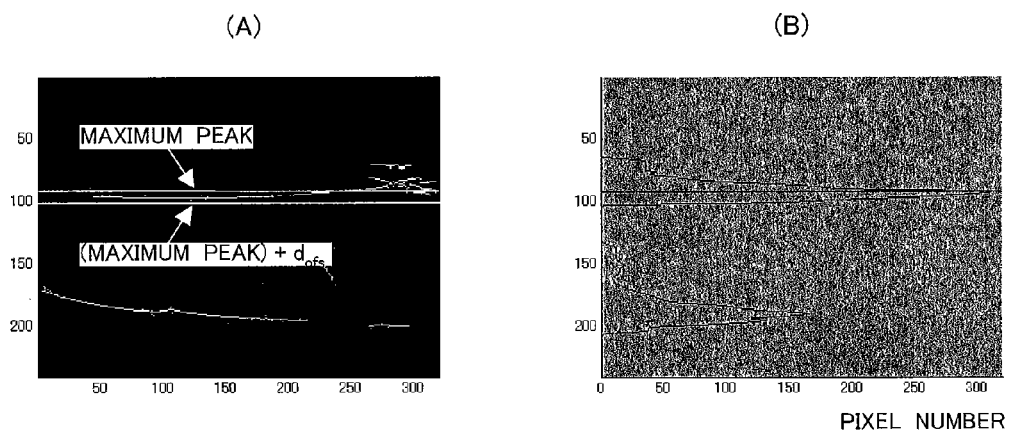
FIGS. 27(A) and 27(B) are views showing an example of the results of moving the region shown in FIGS. 26(A) and 26(B) parallel with respect to a y-axis while counting edge pixels included in the region.

FIG. 27(B) is a view showing an example of results of moving the region shown in FIG. 26 parallel with respect to the y-axis and counting edge pixels included in the region.

As seen also from FIG. 27(B), by counting the number of pixels in the region having a certain width in the y-axis direction, sharp changes of the number of pixels are eased and the position of the maximum peak (y=92) clearly appears.

Note that by imparting the width $d_y$ ($d_y=5$) in the y-axis direction, a width of that worth is generated in the y-axis direction, therefore the border line of the mask is set on the bottom side from the position of the maximum peak by exactly an offset $d_{ofs}$ ($d_{ofs}=10$) (FIG. 27(A)). Due to this, the border line of the top side of the mask is set at the inside from the border line of the object FG.

Step ST203:

After the border line of the top side of the mask is acquired as explained above, next the pixel extraction unit 213 extracts a string of edge pixels predicted to form the contour of the bottom side of the object FG. Namely, the edge pixels included in the region below the border line of the top side of the mask, located on the predetermined plurality of second reference lines, and located at the positions nearest the first reference line on the second reference lines are extracted.

Figure 28:
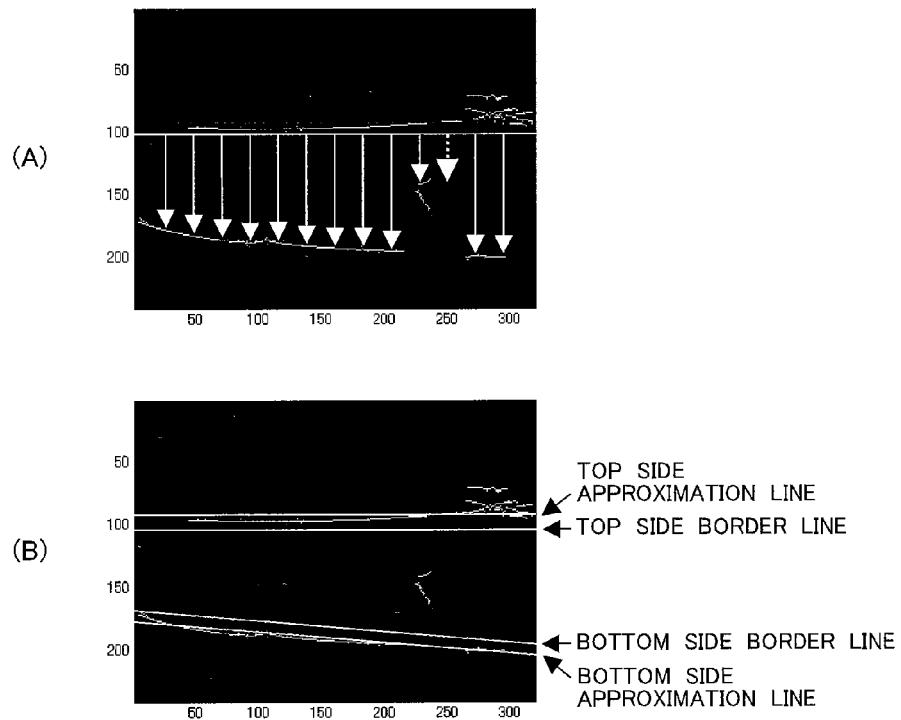
FIGS. 28(A) and 28(B) are views showing an example of acquiring a bottom border line of a mask at the image processing system according to the second embodiment.

For example, edge pixels are sequentially searched for from the intersecting point of the top side border line of the mask and the second reference lines in the down direction to extract the first found edge pixels (FIG. 28(A)).

Such edge pixels are extracted one by one for each second reference line. If there is no edge pixel on a certain second reference line, an edge pixel having the same y-coordinate as the edge pixel extracted at the second reference line next to that may be obtained by interpolation on the second reference line having no edge pixel.

Step ST204:

After the string of edge pixels is extracted at step ST203, next, the division unit 214 finds continuous sections of the string of edge pixels in order to differentiate the edge pixels clearly offset from the contours of the finger. Namely, it divides the string of edge pixels extracted at the pixel extraction unit 213 into one or more sections in which adjacent edge pixels exist within a predetermined distance from each other.

Step ST205:

After the string of edge pixels is divided into continuous sections, next the approximation line acquisition unit 215 acquires the approximation line of the string of edge pixels based on edge pixels belonging to the longest section among the divided continuous sections (there may be a case of only one section).

Step ST206:

After the approximation line based on the longest continuous section of edge pixels is acquired at the approximation line acquisition unit 215, next, the pixel extraction unit 216 extracts a string of edge pixels having a difference from the approximation line acquired at the approximation line acquisition unit 205 within a predetermined range from among all edge pixels extracted at the pixel extraction unit 213.

Step ST207:

After the string of edge pixels having a difference from the approximation line based on the longest continuous section within the predetermined range is extracted, next, the border line acquisition unit 217 acquires the border line of the bottom side of the mask based on the approximation line of the string of edge pixels extracted at the pixel extraction unit 216.

Namely, the approximation line (for example the line by the first order function) of the string of edge pixels extracted at the pixel extraction unit 216 shifted in the up direction by exactly a predetermined offset is acquired as the border line of the bottom side of the mask (FIG. 28(B)).

Step ST208:

After the top and bottom border lines of the mask are acquired according to the above processing, next the border line acquisition unit 208 acquires the left and right border lines for eliminating the parts outside from the finger tip. This technique is the same as for example the previously explained step ST108.

As explained above, according to the present embodiment, by acquiring border lines of the mask based on the distribution of edge pixels, the processing can be simplified in comparison with the case where calculation of the approximation line is necessary, therefore the mask can be prepared at a higher speed.

On the other hand, a method of fixing also the border line of the mask corresponding to the position of the contact surface in a case where the contact surface of the apparatus and the object FG is fixed as in the present embodiment can be considered. With this method, however, there is a possibility of variation of the captured contact surface in accordance with the difference of assembly of the apparatus and vibration or shock etc. applied to the apparatus, so a suitable mask cannot be stably prepared. Accordingly, if the border line of the mask is acquired based on the distribution of edge pixels as in the present embodiment, it becomes possible to stably prepare a suitable mask without complicating the processing so much.

Above, several embodiments of the present invention were explained, but the present invention is not limited to only the above embodiments and includes various modifications.

For example, the first embodiment illustrates the method of finding border lines of the mask based on the approximation line of the intermediate points and the approximation function of the finger width (the distances between the first pixels and the second pixels), but the present invention is not limited to this. For example, approximation lines may be individually calculated for the string of first pixels and the string of second pixels corresponding to the string of intermediate points extracted at the intermediate point extraction unit 206.

For example, in the first embodiment, continuous sections of intermediate points were found, but the present invention is not limited to this. For example when processing each of the string of first pixels and the string of second pixels extracted at the pixel extraction unit 202 by the same block as those of the division unit 214, approximation line acquisition unit 215, pixel extraction unit 216, and border line acquisition unit 217 shown in FIG. 22, the top side border line and the bottom side border line of the mask can be individually acquired.

In the above embodiments, the evaluation value Ev was calculated as the sum of pixel values in the image after applying the edge enhancement and the masking, but the present invention is not limited to this.

For example, the evaluation value acquisition unit 105 may acquire the evaluation value Ev based on the number of pixels having an intensity of edge exceeding the predetermined threshold value among all pixels included in the image enhanced in edges at the edge enhancing unit 104. As seen also from the distribution of FIG. 9, an image including the object FG includes many edges strong in comparison with an image not including the object FG. For this reason, in the image after applying the edge enhancement and the masking, even if the number of pixels having pixel values larger than a certain threshold value (that is, pixels having intensities of edges exceeding the predetermined threshold value) is acquired as the evaluation value Ev, it is possible to judge existence of the object FG with a high precision.

Further, the evaluation value acquisition unit 105 may acquire the evaluation value Ev based on the value of the pixel having the highest intensity of edge among all pixels included in the image enhanced in edges at the edge enhancing unit 104. If explaining specific examples, in the image shown in FIG. 10(C), the maximum value of the pixel values becomes "2257", and in the image shown in FIG. 10(D), the maximum value of the pixel values becomes "428". When the influence of the contours of the object FG is sufficiently eliminated in the region specified by the region specifying unit 103, as in the above example, a large difference occurs in the maximum value of the pixel values in accordance with existence of the object FG. Accordingly, even when the evaluation value Ev is simply acquired based on the maximum value of the pixel values (that is the value of the pixel having the highest intensity of edge), it is possible to judge existence of the object FG with a high precision.

The control unit 10 may be realized by software by a computer as in the above embodiments or at least a portion thereof may be realized by hardware such as a signal processing circuit configured to perform processing of the contents explained above.

In the above embodiments, the example of applying the present invention to the preparation of a mask utilized in biometric authentication (template registration, comparison, etc.) was explained, but the present invention is not limited to this. Namely, the present invention can be widely applied to applications preparing a mask used for cutting out various objects from an image at a high speed by simple processing.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An image processing system for preparing a mask for cutting out an image of a predetermined object from an image, said image processing system comprising:
    an edge extraction unit configured to extract the edges of said image;
    a pixel extraction unit configured to extract a string of first pixels included in a first region contiguous with a first reference line set on a plane of said image so as to pass through an inside of the image of said object, located on a plurality of parallel second reference lines set on the plane of said image, and nearest to said first reference line on the respective plurality of second reference lines and a string of second pixels included in a second region contiguous with said first reference line on an opposite side of said first region, located on said plurality of second reference lines, and nearest said first reference line on the respective plurality of second reference lines from among edges extracted at said edge extraction unit;
    a first intermediate point extraction unit configured to extract a string of intermediate points located between said first pixels and said second pixels on the respective plurality of second reference lines and in which a distance from the first pixels and the distance from the second pixels have a predetermined ratio;
    a division unit configured to divide the string of intermediate points extracted at said first intermediate point extraction unit into at least one section in which adjacent intermediate points are within a predetermined distance of each other;
    an approximation line acquisition unit configured to acquire an approximation line of the string of intermediate points extracted at said first intermediate point extraction unit based on the intermediate points forming the longest section divided at said division unit;
    a second intermediate point extraction unit configured to extract the string of intermediate points having a difference from the approximation line acquired at said approximation line acquisition unit within a predetermined range from among intermediate points extracted at said first intermediate point extraction unit; and
    a first border line acquisition unit configured to acquire a first border line of said mask based on an approximation line of the string of first pixels located on the same second reference lines as the string of intermediate points extracted at said second intermediate point extraction unit and acquire a second border line of said mask based on an approximation line of the string of second pixels located on the second reference lines.

2. An image processing system as set forth in claim 1, wherein:
    said first border line acquisition unit acquires a line obtained by shifting the approximation line of the string of said first pixels toward said first reference line by exactly a predetermined distance as said first border line and acquires a line obtained by shifting the approximation line of the string of said second pixels toward said first reference line by exactly a predetermined distance as said second border line.

3. An image processing system as set forth in claim 1, comprising a third border line acquisition unit for sequentially moving a region surrounded by two sides parallel to said first reference line and two sides parallel to said second reference lines and including a portion of said first border line and a portion of said second border line from a predetermined position on said image in one direction parallel with respect to said first reference line, counting the number of pixels of edges extracted at said edge extraction unit included in the region at each moved position, and acquiring a line parallel to said second reference line which passes through the region at the position where the count reaches the predetermined threshold value as a third border line of said mask.

4. An image processing system as set forth in claim 1, wherein:
where said pixel extraction unit cannot extract at least one of said first pixels and said second pixels in a portion of said plurality of second reference lines, said first intermediate point extraction unit interpolates intermediate points of the portion of the second reference lines based on intermediate points extracted on other second reference lines adjacent to the second reference lines of that portion.

5. An image processing system as set forth in claim 1, wherein:
said first border line acquisition unit acquires said first border line and said second border line based on the intermediate points extracted at said second intermediate point extraction unit and the interval of first pixels and second pixels located on the same second reference lines sandwiching the extracted intermediate points therebetween.

6. An image processing system as set forth in claim 1, further comprising:
an edge enhancing unit configured to enhance the edges of said image extracted at said edge extraction unit,
a region specifying unit configured to specify a region further inside of the object cut out by said mask,
an evaluation value acquisition unit configured to acquire an evaluation value concerning an intensity of edges and/or an amount of edges included in the region specified at said region specifying unit based on values of pixels included in the region at said image enhanced in edges at said edge enhancing unit, and
a judgment unit configured to judge whether or not the image of said object is cut out by said mask based on the evaluation value acquired at said evaluation value acquisition unit.

7. An image processing system for preparing a mask for cutting out an image of a predetermined object from an image, said image processing system comprising:
an edge extraction unit configured to extract edges of said image;
a first pixel extraction unit configured to extract a string of pixels included in one of two regions contiguous with a first reference line set on a plane of said image so as to pass through the inside of the image of said object, located on a plurality of parallel second reference lines set on the plane of said image, and nearest to said first reference line on the respective plurality of second reference lines from among edges extracted at said edge extraction unit;
a division unit configured to divide the string of pixels extracted at said first pixel extraction unit into at least one section in which adjacent pixels are within a predetermined distance of each other;
an approximation line acquisition unit configured to acquire an approximation line of the string of pixels extracted at said first pixel extraction unit based on pixels forming the longest section divided at said division unit;
a second pixel extraction unit configured to extract a string of pixels having a difference from the approximation line acquired at said approximation line acquisition unit within a predetermined range among pixels extracted at said first pixel extraction unit; and
a first border line acquisition unit configured to acquire a first border line of said mask based on the approximation line of the string of pixels extracted at said second pixel extraction unit.

8. An image processing system as set forth in claim 7, further comprising a second border line acquisition unit configured to move a strip shaped region sandwiched by two parallel sides in parallel with respect to said second reference lines, count the number of pixels of edges extracted at said edge extraction unit included in the region at each position of movement, and acquire a second border line of said mask in accordance with the line parallel to said sides included in the region at a position where the count becomes the largest, and
said acquired second border line being set as said first reference line.

9. An image processing system as set forth in claim 8, wherein:
said first border line acquisition unit acquires a line obtained by shifting the approximation line of the string of pixels extracted at said second pixel extraction unit toward said second border line by exactly a predetermined distance as said first border line, and
said second border line acquisition unit acquires a line obtained by shifting the line parallel to said sides included at said region at the position where the count of the number of pixels of said edges becomes the largest toward said first border line by exactly a predetermined distance as said second border line.

10. An image processing system as set forth in claim 8, further comprising a third border line acquisition unit configured to sequentially move a region surrounded by two sides parallel to said first reference line and two sides parallel to said second reference lines and including a portion of said first border line and a portion of said second border line from a predetermined position on said image in one direction parallel with respect to said first reference line, count the number of pixels of edges extracted at said edge extraction unit included in the region at each moved position, and acquire a line parallel to said second reference line which passes through the region at the position where the count reaches a predetermined threshold value as a third border line of said mask.

11. An image processing system as set forth in claim 8, further comprising:
an edge enhancing unit configured to enhance the edges extracted at said edge extraction unit,
a region specifying unit configured to specify a region further inside of the object cut out by said mask,
an evaluation value acquisition unit configured to acquire an evaluation value concerning an intensity of edges and/or an amount of edges included in the region specified at said region specifying unit based on values of pixels included in the region at said image enhanced in edges at said edge enhancing unit, and
a judgment unit configured to judge whether or not an image of said object is cut out by said mask based on the evaluation value acquired at said evaluation value acquisition unit.

12. A mask preparation method for preparing a mask for cutting out an image of a predetermined object from an image, said mask preparation method including:

a first step of extracting the edges of said image;

a second step of extracting a string of first pixels included in a first region contiguous with a first reference line set on a plane of said image so as to pass through an inside of the image of said object, located on a plurality of parallel second reference lines set on the plane of said image, and nearest to said first reference line on the respective plurality of second reference lines and a string of second pixels included in a second region contiguous with said first reference line on an opposite side of said first region, located on said plurality of second reference lines, and nearest to said first reference line on the respective plurality of second reference lines from among edges extracted at said first step;

a third step of extracting a string of intermediate points located between said first pixels and said second pixels on said plurality of second reference lines and in which a distance from the first pixel and the distance from the second pixel have a predetermined ratio;

a fourth step of dividing the string of intermediate points extracted at said third step into one or more sections in which adjacent intermediate points are within a predetermined distance of each other;

a fifth step of acquiring an approximation line of the string of intermediate points extracted at said third step based on the intermediate points forming the longest section divided at said fourth step;

a sixth step of extracting a string of intermediate points having a difference from the approximation line acquired at said fifth step within a predetermined range from among intermediate points extracted at said third step; and a seventh step of acquiring a first border line of said mask based on the approximation line of the string of first pixels located on the same second reference lines as the string of intermediate points extracted at said sixth step and acquiring a second border line of said mask based on the approximation line of the string of second pixels located on the second reference lines.

13. A mask preparation method for preparing a mask for cutting out an image of a predetermined object from an image, said mask preparation method including:

a first step of extracting edges of said image;

a second step of extracting a string of first pixels included in one of two regions contiguous with the first reference line set on the plane of said image so as to pass through the inside of the image of said object, located on a plurality of parallel second reference lines set on the plane of said image, and nearest to said first reference line on the respective plurality of second reference lines from among edges extracted at said first step;

a third step of dividing the string of first pixels extracted at said second step into at least one section in which adjacent first pixels are within a predetermined distance of each other;

a fourth step of acquiring an approximation line of the string of first pixels extracted at said second step based on first pixels forming the longest section divided at said third step;

a fifth step of extracting a string of first pixels having a difference from the approximation line acquired at said fourth step within a predetermined range among first pixels extracted at said second step; and a sixth step of acquiring a first border line of said mask based on the approximation line of the string of first pixels extracted at said fifth step.

14. A mask preparation method as set forth in claim 13, further including a seventh step of moving a strip shaped region sandwiched by two parallel sides in parallel with respect to said second reference lines, counting the number of pixels of edges extracted at said first step included in the region at each position of the movement, and acquiring a second border line of said mask in accordance with the line parallel to said sides included in the region at a position where the count becomes the largest, and said acquired second border line being set as said first reference line.

15. A program on a non-transitory computer-readable medium for making an image processing system having a computer for preparing a mask for cutting out an image of a predetermined object from an image execute:

a first step of extracting the edges of said image;

a second step of extracting a string of first pixels included in a first region contiguous with a first reference line set on a plane of said image so as to pass through an inside of the image of said object, located on a plurality of parallel second reference lines set on the plane of said image, and nearest to said first reference line on the respective plurality of second reference lines and a string of second pixels included in a second region contiguous with said first reference line on an opposite side of said first region, located on said plurality of second reference lines, and nearest to said first reference line on the respective plurality of second reference lines from among edges extracted at said first step;

a third step of extracting a string of intermediate points located between said first pixels and said second pixels on said plurality of second reference lines and in which a distance from the first pixel and the distance from the second pixel have a predetermined ratio;

a fourth step of dividing the string of intermediate points extracted at said third step into one or more sections in which adjacent intermediate points are within a predetermined distance of each other;

a fifth step of acquiring an approximation line of the string of intermediate points extracted at said third step based on the intermediate points forming the longest section divided at said fourth step;

a sixth step of extracting a string of intermediate points having a difference from the approximation line acquired at said fifth step within a predetermined range from among intermediate points extracted at said third step; and a seventh step of acquiring a first border line of said mask based on the approximation line of the string of first pixels located on the same second reference lines as the string of intermediate points extracted at said sixth step and acquiring a second border line of said mask based on the approximation line of the string of second pixels located on the second reference lines.

16. A program on a non-transitory computer-readable medium for making an image processing system having a computer for preparing a mask for cutting out an image of a predetermined object from an image execute:

a first step of extracting edges of said image;

a second step of extracting a string of first pixels included in one of two regions contiguous with the first reference line set on the plane of said image so as to pass through the inside of the image of said object, located on a plurality of parallel second reference lines set on the plane of said image, and nearest to said first reference line on the respective plurality of second reference lines from among edges extracted at said first step;

a third step of dividing the string of first pixels extracted at said second step into at least one section in which adjacent first pixels are within a predetermined distance of each other;

a fourth step of acquiring an approximation line of the string of first pixels extracted at said second step based on first pixels forming the longest section divided at said third step;

a fifth step of extracting a string of first pixels having a difference from the approximation line acquired at said fourth step within a predetermined range among first pixels extracted at said second step; and a sixth step of acquiring a first border line of said mask based on the approximation line of the string of first pixels extracted at said fifth step.

17. A program as set forth in claim 16, further making said image processing system execute a seventh step of moving a strip shaped region sandwiched by two parallel sides in parallel with respect to said second reference lines, counting the number of pixels of edges extracted at said first step included in the region at each position of the movement, and acquiring a second border line of said mask in accordance with the line parallel to said sides included in the region at a position where the count becomes the largest, and said acquired second border line being set as said first reference line.

18. An image processing system for preparing a mask for cutting out an image of a predetermined object from an image, said image processing system comprising:

an edge extracting means for extracting edges of said image;

a pixel extracting means for extracting a string of first pixels included in a first region contiguous with a first reference line set on a plane of said image so as to pass through an inside of the image of said object, located on a plurality of parallel second reference lines set on the plane of said image, and nearest to said first reference line on the respective plurality of second reference lines and a string of second pixels included in a second region contiguous with said first reference line on an opposite side of said first region, located on said plurality of second reference lines, and nearest to said first reference line on the respective plurality of second reference lines from among edges extracted at said edge extracting means;

a first intermediate point extracting means for extracting a string of intermediate points located between said first pixels and said second pixels on said plurality of second reference lines and in which a distance from the first pixels and a distance from the second pixels have a predetermined ratio;

a dividing means for dividing the string of intermediate points extracted at said first intermediate point extracting means into at least one section in which adjacent intermediate points are within a predetermined distance of each other;

an approximation line acquiring means for acquiring an approximation line of the string of intermediate points extracted at said first intermediate point extracting means based on the intermediate points forming the longest section divided at said dividing means;

a second intermediate point extracting means for extracting a string of intermediate points having a difference from the approximation line acquired at said approximation line acquiring means within a predetermined range from among intermediate points extracted at said first intermediate point extracting means; and a first border line acquiring means for acquiring a first border line of said mask based on the approximation line of the string of first pixels located on the same second reference lines as the string of intermediate points extracted at said second intermediate point extracting means and acquiring a second border line of said mask based on the approximation line of the string of second pixels located on the second reference lines.

19. An image processing system as set forth in claim 18, further having a third border line acquiring means for sequentially moving a region surrounded by two sides parallel to said first reference line and two sides parallel to said second reference lines and including a portion of said first border line and a portion of said second border lines from a predetermined position on said image in one direction parallel with respect to said first reference line, counting the number of pixels of edges extracted at said edge extracting means included in the region at each moved position, and acquiring a line parallel to said second reference line which passes through the region at the position where the count reaches a predetermined threshold value as a third border line of said mask.

20. An image processing system as set forth in claim 18, further comprising:

an edge enhancing means for enhancing the edges of said image extracted at said edge extracting means, a region specifying means for specifying a region further inside of the object cut out by said mask, an evaluation value acquiring means for acquiring an evaluation value concerning the intensity of edges and/or the amount of edges included in the region based on the values of pixels included in the region specified at said region specifying means at said image enhanced in edges at said edge enhancing means, and a judging means for judging whether or not the image of said object is cut out by said mask based on the evaluation value acquired at said evaluation value acquiring means.

21. An image processing system for preparing a mask for cutting out an image of a predetermined object from an image, said image processing system comprising:

an edge extracting means for extracting edges of said image;

a first pixel extracting means for extracting a string of pixels included in one of two regions contiguous with a first reference line set on a plane of said image so as to pass through the inside of the image of said object, located on a plurality of parallel second reference lines set on the plane of said image, and nearest to said first reference line on the respective plurality of second reference lines from among edges extracted at said edge extracting means;

a dividing means for dividing the string of pixels extracted at said first pixel extracting means into at least one section in which adjacent pixels are within a predetermined distance of each other;

an approximation line acquiring means for acquiring an approximation line of the string of pixels extracted at said first pixel extracting means based on pixels forming the longest section divided at said dividing means;

a second pixel extracting means for extracting a string of pixels having a difference from the approximation line acquired at said approximation line acquiring means within a predetermined range among pixels extracted at said first pixel extracting means; and a first border line acquiring means for acquiring a first border line of said mask based on the approximation line of the string of pixels extracted at said second pixel extracting means.

22. An image processing system as set forth in claim 21, further comprising a second border line acquiring means for moving a strip shaped region sandwiched by two parallel sides in parallel with respect to said second reference lines, counting the number of pixels of edges extracted at said edge extracting means included in the region at each position of the movement, and acquiring a second border line of said mask in accordance with the line parallel to said sides included in the region at a position where the count becomes the largest, and said acquired second border line being set as said first reference line.

23. An image processing system as set forth in claim 22, further comprising a third border line acquiring means for sequentially moving a region surrounded by two sides parallel to said first reference line and two sides parallel to said second reference lines and including a portion of said first border line and a portion of said second border line from a predetermined position on said image in one direction parallel with respect to said first reference line, counting the number of pixels of edges extracted at said edge extracting means included in the region at each moved position, and acquiring the line parallel to said second reference line which passes through the region at the position where the count reaches the predetermined threshold value as a third border line of said mask.

24. An image processing system as set forth in claim 22, further comprising:

an edge enhancing means for enhancing edges extracted at said edge extracting means, a region specifying means for specifying a region further inside of the object cut out by said mask, an evaluation value acquiring means for acquiring an evaluation value concerning the intensity of edges and/or the amount of edges included in the region based on the value of pixels included in the region specified at said region specifying means at said image enhanced in edges at said edge enhancing means, and a judging means for judging whether or not the image of said object is cut out by said mask based on the evaluation value acquired at said evaluation value acquiring means.

\* \* \* \* \*

UNITED STATES PATENT AND TRADEMARK OFFICE
CERTIFICATE OF CORRECTION

PATENT NO.        : 8,311,332 B2
APPLICATION NO.   : 11/718784
DATED             : November 13, 2012
INVENTOR(S)       : Hiroshi Abe It is certified that error appears in the above-identified patent and that said Letters Patent is hereby corrected as shown below:

ON THE TITLE PAGE OF THE PATENT ITEM [86]:

Please delete "PCT/JP2006/017205" and insert
--PCT/JP2006/317205--.

Signed and Sealed this
Eighteenth Day of June, 2013

Teresa Stanek Rea
*Acting Director of the United States Patent and Trademark Office*